US011388914B2

(12) United States Patent
Mao et al.

(10) Patent No.: US 11,388,914 B2
(45) Date of Patent: Jul. 19, 2022

(54) PROCESS OF PREPARING A WET PET FOOD, WET PET FOOD PRODUCED BY THE PROCESS AND USES THEREOF

(71) Applicant: Mars, Incorporated, McLean, VA (US)

(72) Inventors: Mathieu Mao, Aimargues (FR); Christoph Hendrik Beckmann, Verden (DE); Marinus Pannevis, Verden (DE); Alicia Olivares, Verden (DE); Nadine Schuetz, Verden (DE)

(73) Assignee: Mars, Incorporated, McLean, VA (US)

( * ) Notice: Subject to any disclaimer, the term of this patent is extended or adjusted under 35 U.S.C. 154(b) by 650 days.

(21) Appl. No.: 15/569,608

(22) PCT Filed: Apr. 28, 2016

(86) PCT No.: PCT/US2016/029814
§ 371 (c)(1),
(2) Date: Oct. 26, 2017

(87) PCT Pub. No.: WO2016/176466
PCT Pub. Date: Nov. 3, 2016

(65) Prior Publication Data
US 2018/0295862 A1   Oct. 18, 2018

(30) Foreign Application Priority Data
Apr. 28, 2015   (EP) .................................. 15165413

(51) Int. Cl.
| | |
|---|---|
| *A23K 50/48* | (2016.01) |
| *A23K 40/00* | (2016.01) |
| *A23K 10/26* | (2016.01) |
| *A23K 20/142* | (2016.01) |
| *A23K 10/38* | (2016.01) |
| *A23K 50/40* | (2016.01) |
| *A23K 10/20* | (2016.01) |
| *A23K 20/163* | (2016.01) |
| *A23K 30/00* | (2016.01) |
| *A23K 10/16* | (2016.01) |

(52) U.S. Cl.
CPC .............. *A23K 50/48* (2016.05); *A23K 10/16* (2016.05); *A23K 10/20* (2016.05); *A23K 10/26* (2016.05); *A23K 10/38* (2016.05); *A23K 20/142* (2016.05); *A23K 20/163* (2016.05); *A23K 30/00* (2016.05); *A23K 40/00* (2016.05); *A23K 50/40* (2016.05); *Y02P 60/87* (2015.11)

(58) Field of Classification Search
CPC ...... A23K 50/48; A23K 20/142; A23K 30/00; A23K 40/00; A23K 10/16; A23K 10/26
See application file for complete search history.

(56) References Cited

U.S. PATENT DOCUMENTS

| | | |
|---|---|---|
| 2,504,233 A | 4/1950 | Staunt |
| 2,555,514 A | 6/1951 | Francis et al. |
| 2,695,235 A | 11/1954 | de Goede |
| 2,827,452 A | 3/1958 | Schlenk et al. |
| 3,119,691 A | 1/1964 | Ludington et al. |
| 3,168,796 A | 2/1965 | Scott |
| 3,202,514 A | 8/1965 | Burgess et al. |
| 3,342,612 A | 9/1967 | Foster et al. |
| 3,445,243 A | 5/1969 | Moirano |
| 3,467,525 A | 9/1969 | Hale et al. |
| 3,469,995 A | 9/1969 | Jacoby et al. |
| 3,496,858 A | 2/1970 | Jenkins |
| 3,600,187 A | 8/1971 | Elebogen |
| 3,653,908 A | 4/1972 | Buck et al. |
| 3,658,556 A | 4/1972 | Klein et al. |
| 3,679,429 A | 7/1972 | Mohrman et al. |
| 3,713,837 A | 1/1973 | Leidy et al. |
| 3,767,424 A | 10/1973 | Shimizu et al. |
| 3,804,951 A | 4/1974 | Rapp |
| 3,808,340 A | 4/1974 | Palmer |
| 3,808,341 A | 4/1974 | Rongey et al. |
| 3,812,268 A | 5/1974 | Konigsbacher et al. |
| 3,852,483 A | 12/1974 | Oborsh et al. |
| 3,865,966 A | 2/1975 | Coppage et al. |
| 3,873,736 A | 3/1975 | Palmer et al. |
| 3,881,265 A | 5/1975 | Eaton et al. |
| 3,883,672 A | 5/1975 | Bone et al. |
| 3,886,299 A | 5/1975 | Feldbrugge et al. |
| 3,890,320 A | 6/1975 | Wolt |

(Continued)

FOREIGN PATENT DOCUMENTS

| | | |
|---|---|---|
| AT | 410623 T | 10/2008 |
| AU | 1289988 A | 9/1988 |

(Continued)

OTHER PUBLICATIONS

Definition of "ambient pressure". (1992). In C. G. Morris (Ed.), Academic Press Dictionary of Science and Technology (4th ed.). Elsevier Science & Technology. Credo Reference: https://search.credoreference.com/content/entry/apdst/arnbient_pressure/0?institutionId=743 (Year: 1992).*

Anon, "Scientific Opinion on the Safety and Efficacy of the Use of Amino Acids (chemical group 34) when used as Flavourings for all Animal Species", The EFSA Journal, vol. 12, No. 5:3670.10 pages, May 1, 2014.

Beauchamp, et al., "Flavor Preferences in Cats (*Felis catus* and *Panthera* sp.)", Journal of Comparative and Physiological Psychology Apr. 1977, vol. 91, No. 5, 1118-1127.

Misra, et al., "Nonthermal Plasma Inactivation of Food-Borne Pathogens", Food Engineering Reviews, vol. 3, No. 3, pp. 159-170 (Oct. 2011).

(Continued)

*Primary Examiner* — Walter A Moore
(74) *Attorney, Agent, or Firm* — Morrison & Foerster LLP

(57) ABSTRACT

A process of preparing a sterilized wet pet food product is provided, as well as a sterilized wet pet food product provided by the process. Use of the wet pet food product to feed a companion animal is also contemplated.

13 Claims, No Drawings

(56) References Cited

U.S. PATENT DOCUMENTS

| | | |
|---|---|---|
| 3,898,345 A | 8/1975 | Horrocks et al. |
| 3,904,769 A | 9/1975 | Sair et al. |
| 3,908,025 A | 9/1975 | Miller et al. |
| 3,930,031 A | 12/1975 | Kealy |
| 3,959,511 A | 5/1976 | Balaz et al. |
| 3,962,481 A | 6/1976 | Kumar |
| 3,965,268 A | 6/1976 | Stocker et al. |
| 3,968,268 A | 7/1976 | Sair et al. |
| 3,997,675 A | 12/1976 | Eichelburg |
| 4,011,346 A | 3/1977 | Ernst |
| 4,015,026 A | 3/1977 | Burkwall et al. |
| 4,017,646 A | 4/1977 | Hoer et al. |
| 4,022,915 A | 5/1977 | Zukerman et al. |
| 4,026,967 A | 5/1977 | Flexman et al. |
| 4,029,823 A | 6/1977 | Bone et al. |
| 4,031,267 A | 6/1977 | Berry et al. |
| 4,039,168 A | 8/1977 | Caris et al. |
| 4,039,689 A | 8/1977 | Bone |
| 4,053,650 A | 10/1977 | Chino et al. |
| 4,055,681 A | 10/1977 | Balaz et al. |
| 4,070,490 A | 1/1978 | Lugay et al. |
| 4,088,796 A | 5/1978 | Persson |
| 4,089,978 A | 5/1978 | Lugay et al. |
| 4,092,333 A | 5/1978 | Mookherjee et al. |
| 4,104,406 A | 8/1978 | Stringer et al. |
| 4,104,407 A | 8/1978 | Stringer et al. |
| 4,113,819 A | 9/1978 | Hayashi et al. |
| 4,127,678 A | 11/1978 | Burkwall, Jr. |
| 4,138,507 A | 2/1979 | Iimura |
| 4,141,999 A | 2/1979 | Lolas |
| 4,143,168 A | 3/1979 | Bernotavicz |
| 4,168,322 A | 9/1979 | Buckley et al. |
| 4,169,162 A | 9/1979 | Appleman |
| 4,185,123 A | 1/1980 | Wenger et al. |
| 4,190,679 A | 2/1980 | Coffee et al. |
| 4,196,222 A | 4/1980 | Cheney |
| 4,200,661 A | 4/1980 | Brigand et al. |
| 4,211,797 A | 7/1980 | Cante et al. |
| 4,212,894 A | 7/1980 | Franzen, Jr. et al. |
| 4,212,896 A | 7/1980 | Brown, Jr. et al. |
| 4,215,149 A | 7/1980 | Majlinger |
| 4,225,630 A | 9/1980 | Pitchon |
| 4,229,485 A | 10/1980 | Brown et al. |
| 4,242,367 A | 12/1980 | Igoe |
| 4,247,562 A | 1/1981 | Bernotavicz et al. |
| 4,264,628 A | 4/1981 | Hill |
| 4,266,920 A | 5/1981 | Hayashi et al. |
| 4,267,195 A * | 5/1981 | Boudreau ............ A23K 20/137 426/2 |
| 4,273,788 A | 6/1981 | Bone |
| 4,284,652 A | 8/1981 | Christensen |
| 4,310,558 A | 1/1982 | Nahm et al. |
| 4,315,034 A | 2/1982 | Levinson et al. |
| 4,330,562 A | 5/1982 | Nassar et al. |
| 4,364,925 A | 12/1982 | Fisher |
| 4,366,175 A | 12/1982 | Brown et al. |
| 4,371,556 A | 2/1983 | Pitchon et al. |
| 4,371,557 A | 2/1983 | Oppy et al. |
| 4,371,558 A | 2/1983 | Siregar et al. |
| 4,410,551 A | 10/1983 | Comer et al. |
| 4,411,924 A | 10/1983 | Sevenants |
| 4,418,086 A | 11/1983 | Marino et al. |
| 4,419,372 A | 12/1983 | Green et al. |
| 4,427,704 A | 1/1984 | Cheney et al. |
| 4,454,163 A | 6/1984 | Gellman et al. |
| 4,454,164 A | 6/1984 | Gellman et al. |
| 4,454,804 A | 6/1984 | McCulloch et al. |
| 4,508,741 A | 4/1985 | Corbett et al. |
| 4,518,696 A | 5/1985 | Gerhmann et al. |
| 4,534,989 A | 8/1985 | Gellman et al. |
| 4,534,990 A | 8/1985 | Gellman et al. |
| 4,537,783 A | 8/1985 | Liepa |
| 4,552,775 A | 11/1985 | Baeling et al. |
| 4,581,238 A | 4/1986 | White et al. |
| 4,698,004 A | 10/1987 | Ramnarine |
| 4,702,914 A | 10/1987 | Ryan |
| 4,702,924 A | 10/1987 | Owens et al. |
| 4,713,250 A | 12/1987 | Tonyes et al. |
| 4,743,458 A | 5/1988 | Brotz |
| 4,743,460 A | 5/1988 | Gellman et al. |
| 4,777,058 A | 10/1988 | Chandler et al. |
| 4,781,939 A | 11/1988 | Martin et al. |
| 4,784,860 A | 11/1988 | Gellman et al. |
| 4,784,862 A | 11/1988 | Wotherspoon |
| 4,791,002 A * | 12/1988 | Baker .................. B65B 25/067 426/129 |
| 4,791,735 A | 12/1988 | Forberg |
| 4,804,549 A | 2/1989 | Howley et al. |
| 4,810,509 A | 3/1989 | Kanegae et al. |
| 4,822,626 A | 4/1989 | Spanier et al. |
| 4,844,936 A | 7/1989 | Cox et al. |
| 4,870,059 A | 9/1989 | Mitsuhashi et al. |
| 4,873,096 A | 10/1989 | Spiel et al. |
| 4,888,192 A | 12/1989 | Ramnarine |
| 4,895,731 A | 1/1990 | Baker et al. |
| 4,900,572 A | 2/1990 | Repholz et al. |
| 4,904,494 A | 2/1990 | Spanier |
| 4,904,495 A | 2/1990 | Spanier et al. |
| 4,910,038 A | 3/1990 | Ducharme |
| 4,927,763 A | 5/1990 | Sudoma et al. |
| 4,938,976 A | 7/1990 | Shemer |
| 4,954,061 A | 9/1990 | Repholz et al. |
| 4,956,295 A | 9/1990 | Sudoma |
| 4,966,733 A | 10/1990 | Fernando et al. |
| 5,000,940 A | 3/1991 | Staples et al. |
| 5,011,679 A | 4/1991 | Spanier et al. |
| 5,015,485 A | 5/1991 | Scaglione et al. |
| 5,024,320 A | 6/1991 | Musschoot |
| 5,034,232 A | 7/1991 | Sugitani et al. |
| 5,045,339 A | 9/1991 | Ducharme |
| 5,067,431 A | 11/1991 | Heitmiller |
| 5,085,874 A | 2/1992 | Jungvid |
| 5,100,679 A | 3/1992 | Delrue |
| 5,121,758 A | 6/1992 | Schmekel et al. |
| 5,132,137 A | 7/1992 | Reimann et al. |
| 5,147,668 A | 9/1992 | Munk |
| 5,183,690 A | 2/1993 | Carr |
| 5,185,174 A | 2/1993 | Sawhill |
| 5,186,964 A | 2/1993 | Gierhart et al. |
| 5,188,302 A | 2/1993 | Alvarez |
| 5,204,102 A | 4/1993 | Coles et al. |
| 5,209,156 A | 5/1993 | Lombard |
| 5,240,728 A | 8/1993 | Grenet et al. |
| 5,252,136 A | 10/1993 | Desforges et al. |
| 5,260,089 A | 11/1993 | Thornberg |
| 5,281,431 A | 1/1994 | Dunckel |
| 5,283,059 A | 2/1994 | Suzuki et al. |
| 5,296,217 A | 3/1994 | Stookey et al. |
| 5,333,538 A | 8/1994 | Sawa |
| 5,340,888 A | 8/1994 | Lemon et al. |
| 5,362,511 A | 11/1994 | Villagran et al. |
| 5,405,836 A | 4/1995 | Richar et al. |
| 5,456,933 A | 10/1995 | Lee |
| 5,456,934 A | 10/1995 | Lee et al. |
| 5,478,570 A | 12/1995 | Sonohara |
| 5,480,641 A | 1/1996 | Casas-Perez |
| 5,480,662 A | 1/1996 | Boode-Boissevain et al. |
| 5,487,910 A | 1/1996 | Zabel et al. |
| 5,505,969 A | 4/1996 | Wood et al. |
| 5,508,243 A | 4/1996 | Mitzkat |
| 5,521,079 A | 5/1996 | Dorian et al. |
| 5,527,549 A | 6/1996 | Bernacchi et al. |
| 5,527,693 A | 6/1996 | Cardillo et al. |
| 5,532,010 A | 7/1996 | Spanier et al. |
| 5,543,157 A | 8/1996 | Trinh et al. |
| 5,552,176 A | 9/1996 | Marino |
| 5,592,748 A | 1/1997 | Mitzkat et al. |
| 5,593,717 A | 1/1997 | Huber et al. |
| 5,603,974 A | 2/1997 | Wood et al. |
| 5,603,976 A | 2/1997 | Share et al. |
| 5,645,878 A | 7/1997 | Breslin et al. |
| 5,650,184 A | 7/1997 | Humphry et al. |
| 5,665,419 A | 9/1997 | Teraguchi et al. |
| 5,690,988 A | 11/1997 | Lin et al. |

(56) References Cited

U.S. PATENT DOCUMENTS

| | | |
|---|---|---|
| 5,698,246 A | 12/1997 | Villamar |
| 5,741,505 A | 4/1998 | Beyer et al. |
| 5,780,039 A | 7/1998 | Greenberg et al. |
| 5,786,008 A | 7/1998 | Humphry et al. |
| 5,792,504 A | 8/1998 | Poppel et al. |
| 5,816,386 A | 10/1998 | Carlyle |
| 5,855,857 A | 1/1999 | Dithmer |
| 5,869,121 A | 2/1999 | Brescia et al. |
| 5,883,161 A | 3/1999 | Wood et al. |
| 5,887,415 A | 3/1999 | Matthews et al. |
| 5,888,131 A | 3/1999 | Kobussen et al. |
| 5,894,029 A | 4/1999 | Brown et al. |
| 5,895,587 A | 4/1999 | Sorensen |
| 5,900,248 A | 5/1999 | Crane et al. |
| 5,922,392 A | 7/1999 | Kelly et al. |
| 5,928,705 A | 7/1999 | Matthews et al. |
| 5,932,258 A | 8/1999 | Sunvold |
| 5,932,275 A | 8/1999 | Nalur |
| 5,948,431 A | 9/1999 | Lavery |
| 5,958,487 A | 9/1999 | Emberger et al. |
| 5,968,569 A | 10/1999 | Cavadini et al. |
| 6,010,725 A | 1/2000 | Meister et al. |
| 6,035,543 A | 3/2000 | Carlyle |
| 6,042,857 A | 3/2000 | Jones et al. |
| 6,056,822 A | 5/2000 | Jefferson et al. |
| 6,063,414 A | 5/2000 | Jones et al. |
| 6,080,419 A | 6/2000 | Stookey |
| 6,083,520 A | 7/2000 | Toneby |
| 6,110,511 A | 8/2000 | Rollins et al. |
| 6,113,970 A | 9/2000 | Rainey et al. |
| 6,117,477 A | 9/2000 | Paluch et al. |
| 6,132,786 A | 10/2000 | Poulos et al. |
| 6,146,671 A | 11/2000 | Catron et al. |
| 6,150,004 A | 11/2000 | Oikawa et al. |
| 6,159,508 A | 12/2000 | Wolf |
| 6,165,503 A | 12/2000 | Gaaseroed et al. |
| 6,171,640 B1 | 1/2001 | Bringe |
| 6,200,609 B1 | 3/2001 | Meister et al. |
| 6,203,825 B1 | 3/2001 | Hodgkins |
| 6,218,013 B1 | 4/2001 | Wood et al. |
| 6,221,350 B1 | 4/2001 | Brown et al. |
| 6,228,418 B1 | 5/2001 | Gluck et al. |
| 6,230,875 B1 | 5/2001 | Carlyle |
| 6,238,708 B1 | 5/2001 | Hayek et al. |
| 6,254,910 B1 | 7/2001 | Paluch |
| 6,270,820 B1 | 8/2001 | Fritz-Jung et al. |
| 6,274,190 B1 | 8/2001 | Long et al. |
| 6,277,420 B1 | 8/2001 | Andersen et al. |
| 6,277,435 B1 | 8/2001 | Lacombe et al. |
| 6,280,779 B1 | 8/2001 | Nadeau et al. |
| 6,309,676 B1 | 10/2001 | Lewandowski |
| 6,312,746 B2 | 11/2001 | Paluch |
| 6,350,485 B2 | 2/2002 | Brunner |
| 6,355,295 B1 | 3/2002 | Altemueller et al. |
| 6,368,591 B1 | 4/2002 | Chen et al. |
| 6,372,282 B1 | 4/2002 | Edens et al. |
| 6,379,738 B1 | 4/2002 | Dingman et al. |
| 6,387,393 B1 | 5/2002 | Lavery |
| 6,403,142 B1 | 6/2002 | McDaniel, III et al. |
| 6,410,079 B2 | 6/2002 | Cheuk et al. |
| 6,436,463 B1 | 8/2002 | Cheuk et al. |
| 6,440,485 B1 | 8/2002 | Cheuk et al. |
| 6,451,553 B1 | 9/2002 | Olsen |
| 6,455,083 B1 | 9/2002 | Wang |
| 6,457,255 B1 | 10/2002 | Carlyle |
| 6,479,051 B1 | 11/2002 | Bruce et al. |
| 6,482,794 B1 | 11/2002 | Farbood et al. |
| 6,495,176 B1 | 12/2002 | McGenity et al. |
| 6,500,463 B1 | 12/2002 | Van Lengerich |
| 6,509,007 B2 | 1/2003 | Rajaiah et al. |
| 6,517,232 B1 | 2/2003 | Blue |
| 6,517,877 B2 | 2/2003 | Gannon |
| 6,550,955 B2 | 4/2003 | D'Silva |
| 6,582,740 B1 | 6/2003 | May et al. |
| 6,582,746 B2 | 6/2003 | Altemueller et al. |
| 6,592,924 B2 | 7/2003 | Blank et al. |
| 6,613,372 B1 | 9/2003 | Schlebusch et al. |
| 6,635,301 B1 | 10/2003 | Howsam |
| 6,652,892 B2 | 11/2003 | McGenity et al. |
| 6,660,319 B1 | 12/2003 | Shi et al. |
| 6,682,747 B1 | 1/2004 | Türek et al. |
| 6,699,701 B1 | 3/2004 | Sulakvelidze et al. |
| 6,703,040 B2 | 3/2004 | Katsarava et al. |
| 6,783,792 B2 | 8/2004 | McDaniel, III et al. |
| 6,797,291 B2 | 9/2004 | Richardson |
| 6,817,315 B1 | 11/2004 | Tsengas et al. |
| 6,821,534 B2 | 11/2004 | McDaniel, III et al. |
| 6,827,957 B2 | 12/2004 | Paluch et al. |
| 6,841,178 B2 | 1/2005 | Cupp et al. |
| 6,841,179 B2 | 1/2005 | Lin et al. |
| 6,846,465 B2 | 1/2005 | Commereuc et al. |
| 6,884,443 B2 | 4/2005 | Domingues et al. |
| 6,911,224 B1 | 6/2005 | May et al. |
| 6,926,917 B2 | 8/2005 | Parthasarathy |
| 6,948,611 B2 | 9/2005 | Dumbaugh |
| 6,962,722 B2 | 11/2005 | Dawley et al. |
| 6,979,467 B1 | 12/2005 | Garces et al. |
| 6,984,449 B2 | 1/2006 | Brtschneider et al. |
| 6,991,819 B2 | 1/2006 | Pannevis et al. |
| 7,001,618 B1 | 2/2006 | Sunvold et al. |
| 7,037,048 B2 | 5/2006 | Markowski et al. |
| 7,037,708 B1 | 5/2006 | Runge et al. |
| 7,067,150 B2 | 6/2006 | Farber et al. |
| 7,089,882 B1 | 8/2006 | Tsengas |
| 7,122,370 B2 | 10/2006 | Porubcan |
| 7,163,708 B2 | 1/2007 | Dalziel et al. |
| 7,186,437 B2 | 3/2007 | Guiller et al. |
| 7,189,390 B2 | 3/2007 | Zink et al. |
| 7,195,906 B2 | 3/2007 | Collins et al. |
| 7,205,138 B2 | 4/2007 | Dunn-Coleman et al. |
| 7,211,280 B1 | 5/2007 | Young et al. |
| 7,211,426 B2 | 5/2007 | Bruessow et al. |
| 7,229,818 B2 | 6/2007 | Porubcan |
| 7,244,460 B2 | 7/2007 | Lee et al. |
| 7,258,879 B1 | 8/2007 | Hodge et al. |
| 7,288,275 B2 | 10/2007 | Axelrod et al. |
| 7,303,778 B2 | 12/2007 | McMindes et al. |
| 7,318,920 B2 | 1/2008 | Christenson |
| 7,320,876 B2 | 1/2008 | Webel et al. |
| 7,322,569 B2 | 1/2008 | Kraus |
| 7,331,252 B2 | 2/2008 | Pachov |
| 7,377,728 B2 | 5/2008 | Markowski et al. |
| 7,381,406 B2 | 6/2008 | Zink et al. |
| 7,388,077 B2 | 6/2008 | Mygind et al. |
| 7,390,520 B2 | 6/2008 | Dempsey et al. |
| 7,413,887 B2 | 8/2008 | Dunn-Coleman et al. |
| 7,459,272 B2 | 12/2008 | Morris et al. |
| 7,479,286 B2 | 1/2009 | Couzy et al. |
| 7,479,294 B2 | 1/2009 | Sokhey et al. |
| 7,494,677 B2 | 2/2009 | Merrill et al. |
| 7,507,571 B2 | 3/2009 | Paternack et al. |
| 7,540,694 B2 | 6/2009 | Markowski et al. |
| 7,547,527 B2 | 6/2009 | Baur et al. |
| 7,550,279 B2 | 6/2009 | Nickel |
| 7,556,836 B2 | 7/2009 | Mueller et al. |
| 7,575,771 B2 | 8/2009 | Ciantar et al. |
| 7,604,829 B2 | 10/2009 | Schopf et al. |
| 7,622,293 B2 | 11/2009 | Sulakvelidze et al. |
| 7,625,556 B2 | 12/2009 | Sulakvelidze et al. |
| 7,625,739 B2 | 12/2009 | Pasternack et al. |
| 7,625,740 B2 | 12/2009 | Pasternack et al. |
| 7,625,741 B2 | 12/2009 | Pasternack et al. |
| 7,635,584 B2 | 12/2009 | Sulakvelidze et al. |
| 7,645,471 B2 | 1/2010 | Harris |
| 7,651,708 B2 | 1/2010 | Schlebusch et al. |
| 7,670,633 B2 | 3/2010 | Srinivasan et al. |
| 7,674,467 B2 | 3/2010 | Sulakvelidze et al. |
| 7,678,404 B2 | 3/2010 | Shiraishi et al. |
| 7,678,406 B2 | 3/2010 | Heydtmann et al. |
| 7,687,077 B2 | 3/2010 | Khoo |
| 7,700,141 B2 | 4/2010 | Baillon et al. |
| 7,703,411 B1 | 4/2010 | Bakos et al. |
| 7,722,910 B2 | 5/2010 | Fernandes et al. |
| 7,722,911 B2 | 5/2010 | Liu et al. |

(56) References Cited

U.S. PATENT DOCUMENTS

| | | | |
|---|---|---|---|
| 7,736,686 B2 * | 6/2010 | Dingman | A23L 13/426 426/646 |
| 7,745,194 B2 | 6/2010 | Pasternack et al. | |
| 7,757,836 B2 | 7/2010 | Karpinsky et al. | |
| 7,763,298 B2 | 7/2010 | Archibald | |
| 7,771,982 B2 | 8/2010 | Zink et al. | |
| 7,785,635 B1 | 8/2010 | Boileau et al. | |
| 7,814,338 B2 | 10/2010 | Johnson | |
| 7,838,057 B2 | 11/2010 | Schmidt et al. | |
| 7,842,329 B2 | 11/2010 | Saylock et al. | |
| 7,867,540 B2 | 1/2011 | Didzbalis et al. | |
| 7,879,377 B2 | 2/2011 | Dahl et al. | |
| 7,910,127 B2 | 3/2011 | Connolly et al. | |
| 7,923,577 B2 | 4/2011 | Bardsley et al. | |
| 7,951,493 B2 | 5/2011 | Lin et al. | |
| 7,951,575 B2 | 5/2011 | Bruessow et al. | |
| 7,977,319 B1 | 7/2011 | Levine | |
| 7,989,013 B2 | 8/2011 | Chaintreau et al. | |
| 7,998,473 B2 | 8/2011 | Boileau et al. | |
| 8,003,323 B2 | 8/2011 | Morris et al. | |
| 8,021,657 B2 | 9/2011 | Bruessow et al. | |
| 8,034,601 B2 | 10/2011 | Boileau et al. | |
| 8,114,454 B2 | 2/2012 | Clark et al. | |
| 8,146,538 B2 | 4/2012 | Kling et al. | |
| 8,148,325 B2 | 4/2012 | Yamka et al. | |
| 8,153,174 B2 | 4/2012 | Hansen | |
| 8,181,592 B2 | 5/2012 | Karpinsky et al. | |
| 8,210,746 B2 | 7/2012 | Kerr et al. | |
| 8,257,775 B2 | 9/2012 | Axelrod et al. | |
| 8,263,146 B2 | 9/2012 | Bengtsson-Riveros et al. | |
| 8,269,378 B2 | 9/2012 | Lucas et al. | |
| 8,277,866 B2 | 10/2012 | Plattner et al. | |
| 8,288,391 B2 | 10/2012 | Johnson et al. | |
| 8,309,077 B2 | 11/2012 | Murthy et al. | |
| 8,323,683 B2 | 12/2012 | Mody et al. | |
| 8,323,711 B2 | 12/2012 | Brandt, Jr. et al. | |
| 8,359,995 B2 | 1/2013 | Bakos et al. | |
| 8,372,460 B2 | 2/2013 | Meyers et al. | |
| 8,435,732 B2 | 5/2013 | Chattopadhyay et al. | |
| 8,460,726 B2 | 6/2013 | Harel et al. | |
| 8,475,834 B2 | 7/2013 | Perez et al. | |
| 8,501,224 B2 | 8/2013 | Schert et al. | |
| 8,524,299 B2 | 9/2013 | Brent, Jr. | |
| 8,529,965 B2 | 9/2013 | Yamka et al. | |
| 8,529,976 B2 | 9/2013 | McMindes et al. | |
| 8,541,065 B2 | 9/2013 | Lukowski et al. | |
| 8,548,817 B2 | 10/2013 | Torney et al. | |
| 8,550,694 B2 | 10/2013 | Miller et al. | |
| 8,551,546 B2 | 10/2013 | Rasanayagam et al. | |
| 8,597,705 B2 | 12/2013 | Hellaby et al. | |
| 8,609,166 B2 | 12/2013 | Laborbe et al. | |
| 8,647,690 B2 | 2/2014 | Corrigan | |
| 8,652,548 B2 | 2/2014 | Kortes | |
| 8,685,696 B2 | 4/2014 | Pasternack et al. | |
| 8,685,697 B1 | 4/2014 | Pasternack et al. | |
| 8,691,303 B2 | 4/2014 | Sunvold et al. | |
| 8,691,792 B2 | 4/2014 | Xu et al. | |
| 8,697,116 B2 | 4/2014 | Saylock et al. | |
| 8,697,174 B2 | 4/2014 | Teconchuk et al. | |
| 8,715,717 B2 | 5/2014 | Miller et al. | |
| 8,771,675 B2 | 7/2014 | Zink et al. | |
| 8,802,158 B2 | 8/2014 | Boileau et al. | |
| 8,809,035 B2 | 8/2014 | Boileau et al. | |
| 8,835,497 B2 | 9/2014 | Friesen et al. | |
| 8,839,713 B2 | 9/2014 | Foerster | |
| 8,877,178 B2 | 11/2014 | Boileau et al. | |
| 8,887,659 B2 | 11/2014 | Fiesser | |
| 8,894,991 B2 | 11/2014 | Boileau et al. | |
| 8,920,862 B2 | 12/2014 | Sagalowicz et al. | |
| 8,956,628 B2 | 2/2015 | Mathers et al. | |
| 9,005,680 B2 | 4/2015 | Fetissova et al. | |
| 9,005,689 B2 | 4/2015 | Davidek et al. | |
| 9,044,497 B2 | 6/2015 | Harel et al. | |
| 9,072,310 B2 | 7/2015 | Harel et al. | |
| 9,111,461 B2 | 8/2015 | Campbell | |
| 9,131,703 B2 | 9/2015 | Marchal et al. | |
| 9,173,423 B2 | 11/2015 | Horgan | |
| 9,192,177 B2 | 11/2015 | Boileau et al. | |
| 9,210,945 B2 | 12/2015 | Horgan | |
| 9,295,656 B2 | 3/2016 | Ueda | |
| 9,427,000 B2 | 8/2016 | Boileau et al. | |
| 9,441,257 B2 | 9/2016 | Choi et al. | |
| 9,585,412 B2 | 3/2017 | Corrigan et al. | |
| 9,635,836 B2 | 5/2017 | Weinberg et al. | |
| 9,968,115 B2 | 5/2018 | Rayner et al. | |
| 2001/0041202 A1 | 11/2001 | Dupont et al. | |
| 2002/0025325 A1 | 2/2002 | Chu et al. | |
| 2002/0058683 A1 | 5/2002 | Tinembart et al. | |
| 2003/0044492 A1 | 3/2003 | Knigge et al. | |
| 2003/0077356 A1 | 4/2003 | Campbell et al. | |
| 2003/0082247 A1 | 5/2003 | Takebe | |
| 2003/0175387 A1 | 9/2003 | English | |
| 2003/0194423 A1 | 10/2003 | Torney et al. | |
| 2003/0215547 A1 | 11/2003 | Leyh | |
| 2004/0033293 A1 | 2/2004 | Albert | |
| 2004/0037943 A1 | 2/2004 | Saylock et al. | |
| 2004/0047896 A1 | 3/2004 | Malnoe et al. | |
| 2004/0052923 A1 | 3/2004 | Knol et al. | |
| 2004/0062833 A1 | 4/2004 | McGenity et al. | |
| 2004/0071828 A1 | 4/2004 | Troy et al. | |
| 2004/0115246 A1 | 6/2004 | Locatelli | |
| 2004/0126459 A1 | 7/2004 | Raczek | |
| 2004/0191224 A1 | 9/2004 | Sulakvelidze et al. | |
| 2004/0208853 A1 | 10/2004 | Sulakvelidze et al. | |
| 2004/0213888 A1 | 10/2004 | Hoshi et al. | |
| 2004/0234580 A1 | 11/2004 | Huber et al. | |
| 2005/0008735 A1 | 1/2005 | Pearce | |
| 2005/0079244 A1 | 4/2005 | Giffard et al. | |
| 2005/0100559 A1 | 5/2005 | Myatt et al. | |
| 2005/0106132 A1 | 5/2005 | Porubcan | |
| 2005/0139167 A1 | 6/2005 | Leo | |
| 2005/0142169 A1 * | 6/2005 | Imafidon | A23K 20/121 424/442 |
| 2005/0152884 A1 | 7/2005 | Boileau et al. | |
| 2005/0153018 A1 | 7/2005 | Ubbink et al. | |
| 2005/0158291 A1 | 7/2005 | Breton | |
| 2005/0158294 A1 | 7/2005 | Boileau et al. | |
| 2005/0158367 A1 | 7/2005 | Hershberger | |
| 2005/0170067 A1 | 8/2005 | Shao | |
| 2005/0181097 A1 | 8/2005 | Townsend et al. | |
| 2005/0186305 A1 | 8/2005 | Rosenberg et al. | |
| 2005/0233038 A1 | 10/2005 | Weinberg | |
| 2005/0249837 A1 | 11/2005 | Massimino et al. | |
| 2005/0266069 A1 | 12/2005 | Simmons et al. | |
| 2005/0271709 A1 | 12/2005 | Dazliel et al. | |
| 2005/0281910 A1 | 12/2005 | Schiffrin et al. | |
| 2006/0062875 A1 | 3/2006 | Gopal | |
| 2006/0062892 A1 | 3/2006 | Merrick | |
| 2006/0073261 A1 | 4/2006 | McMindes et al. | |
| 2006/0088650 A1 | 4/2006 | McGrane | |
| 2006/0093726 A1 | 5/2006 | Bachmeier et al. | |
| 2006/0099321 A1 | 5/2006 | Sievert | |
| 2006/0105098 A1 | 5/2006 | Merrick | |
| 2006/0124675 A1 | 6/2006 | Calicott | |
| 2006/0134132 A1 | 6/2006 | Watkins et al. | |
| 2006/0134183 A1 | 6/2006 | Huetter et al. | |
| 2006/0147583 A1 | 7/2006 | Schlebusch et al. | |
| 2006/0147585 A1 | 7/2006 | Wincklemann et al. | |
| 2006/0188632 A1 | 8/2006 | Nie et al. | |
| 2006/0204623 A1 | 9/2006 | Levin | |
| 2006/0228422 A1 | 10/2006 | Sava et al. | |
| 2006/0228448 A1 | 10/2006 | Boileau et al. | |
| 2006/0246173 A1 | 11/2006 | Raffo | |
| 2006/0260537 A1 | 11/2006 | Brent, Jr. | |
| 2006/0263416 A1 | 11/2006 | Brent, Jr. | |
| 2006/0270020 A1 | 11/2006 | Boileau et al. | |
| 2006/0286246 A1 | 12/2006 | McPherson et al. | |
| 2007/0009647 A1 | 1/2007 | Huetter et al. | |
| 2007/0031542 A1 | 2/2007 | Che et al. | |
| 2007/0054357 A1 | 3/2007 | Pasternack et al. | |
| 2007/0059297 A1 | 3/2007 | Waldron et al. | |
| 2007/0071852 A1 * | 3/2007 | Krueger | B65D 51/20 426/106 |
| 2007/0092630 A1 | 4/2007 | Chu et al. | |

(56) References Cited

U.S. PATENT DOCUMENTS

| | | |
|---|---|---|
| 2007/0098744 A1 | 5/2007 | Knorr et al. |
| 2007/0113796 A1 | 5/2007 | Schildgen et al. |
| 2007/0148282 A1 | 6/2007 | Zubair et al. |
| 2007/0160589 A1 | 7/2007 | Mattson et al. |
| 2007/0166446 A1 | 7/2007 | Boursier |
| 2007/0196502 A1 | 8/2007 | Mort et al. |
| 2007/0218164 A1 | 9/2007 | Stojanovic |
| 2007/0243297 A1 | 10/2007 | Keller et al. |
| 2007/0251465 A1 | 11/2007 | Shafer et al. |
| 2007/0269553 A1 | 11/2007 | Le et al. |
| 2007/0269562 A1 | 11/2007 | Chukwu |
| 2007/0269567 A1 | 11/2007 | McMindes et al. |
| 2007/0269572 A1 | 11/2007 | Turner |
| 2007/0280964 A1 | 12/2007 | Knorr et al. |
| 2008/0050479 A1 | 2/2008 | Hodge et al. |
| 2008/0076823 A1 | 3/2008 | Watkins et al. |
| 2008/0085350 A1 | 4/2008 | Shi et al. |
| 2008/0095752 A1 | 4/2008 | Chiang et al. |
| 2008/0102161 A1 | 5/2008 | Ota et al. |
| 2008/0138464 A1 | 6/2008 | Townsend et al. |
| 2008/0145341 A1 | 6/2008 | Myatt et al. |
| 2008/0145411 A1 | 6/2008 | Shinagawa et al. |
| 2008/0175949 A1 | 7/2008 | Horgan et al. |
| 2008/0175954 A1 | 7/2008 | Horgan et al. |
| 2008/0175955 A1 | 7/2008 | Horgan et al. |
| 2008/0175957 A1 | 7/2008 | Horgan et al. |
| 2008/0206405 A1 | 8/2008 | Axelrod et al. |
| 2008/0220126 A1 | 9/2008 | Boileau et al. |
| 2008/0233244 A1 | 9/2008 | Swenson |
| 2008/0248156 A1 | 10/2008 | Boileau et al. |
| 2008/0254177 A1 | 10/2008 | Lin et al. |
| 2008/0260893 A1 | 10/2008 | Giffard et al. |
| 2008/0260902 A1 | 10/2008 | Van Houten et al. |
| 2008/0268112 A1 | 10/2008 | Rolan et al. |
| 2008/0280274 A1 | 11/2008 | Freisen et al. |
| 2008/0299260 A1 | 12/2008 | Strahm et al. |
| 2008/0302678 A1 | 12/2008 | Hunwisk et al. |
| 2008/0305094 A1 | 12/2008 | Pridmore-Merten |
| 2008/0305210 A1 | 12/2008 | Petersen |
| 2008/0311226 A1 | 12/2008 | Yamka et al. |
| 2008/0317904 A1 | 12/2008 | Kortes et al. |
| 2008/0317905 A1 | 12/2008 | Yamka et al. |
| 2009/0017163 A1 | 1/2009 | Garbolino et al. |
| 2009/0053368 A1 | 2/2009 | Fox et al. |
| 2009/0087831 A1 | 4/2009 | Sulakvelidze et al. |
| 2009/0104315 A1 | 4/2009 | Friesen et al. |
| 2009/0110778 A1 | 4/2009 | Muscroft |
| 2009/0110802 A1 | 4/2009 | Pibarot et al. |
| 2009/0136163 A1 | 5/2009 | Kerr et al. |
| 2009/0148589 A1 | 6/2009 | Fox et al. |
| 2009/0186121 A1 | 7/2009 | Hutchinson et al. |
| 2009/0196991 A1 | 8/2009 | Mizwicki et al. |
| 2009/0208612 A1 | 8/2009 | Reiser et al. |
| 2009/0214709 A1 | 8/2009 | Fuhrmeister et al. |
| 2009/0220646 A1 | 9/2009 | Street et al. |
| 2009/0246336 A1 | 10/2009 | Burnett et al. |
| 2009/0263542 A1 | 10/2009 | Lin et al. |
| 2009/0274796 A1 | 11/2009 | Yamka et al. |
| 2009/0274800 A1 | 11/2009 | Assenmacher et al. |
| 2009/0324761 A1 | 12/2009 | Khoo et al. |
| 2010/0003393 A1 | 1/2010 | Torney et al. |
| 2010/0047397 A1 | 2/2010 | Levin |
| 2010/0068337 A1 | 3/2010 | Reber et al. |
| 2010/0086659 A1 | 4/2010 | Schmidt |
| 2010/0092611 A1 | 4/2010 | Degre et al. |
| 2010/0098806 A1 | 4/2010 | Van Drunen |
| 2010/0136162 A1 | 6/2010 | Cupp et al. |
| 2010/0136201 A1 | 6/2010 | Bigeard et al. |
| 2010/0150870 A1 | 6/2010 | Young et al. |
| 2010/0166709 A1 | 7/2010 | Kang et al. |
| 2010/0166940 A1 | 7/2010 | McMindes et al. |
| 2010/0189767 A1 | 7/2010 | Shimoni et al. |
| 2010/0209572 A1 | 8/2010 | Guidetti |
| 2010/0233320 A1 | 9/2010 | Sunvold et al. |
| 2010/0233347 A1 | 9/2010 | Uhrhan et al. |
| 2010/0233756 A1 | 9/2010 | Sunvold et al. |
| 2010/0239712 A1 | 9/2010 | Brooks et al. |
| 2010/0260888 A1 | 10/2010 | Shibata et al. |
| 2010/0266560 A1 | 10/2010 | Swaminathan et al. |
| 2010/0266727 A1 | 10/2010 | Swaminathan et al. |
| 2010/0272655 A1 | 10/2010 | Bardsley et al. |
| 2010/0303951 A1 | 12/2010 | Sunvold et al. |
| 2010/0303966 A1 | 12/2010 | Sunvold et al. |
| 2010/0303967 A1 | 12/2010 | Sunvold et al. |
| 2010/0303968 A1 | 12/2010 | Sunvold et al. |
| 2010/0303976 A1 | 12/2010 | Corrigan et al. |
| 2010/0303978 A1 | 12/2010 | Sunvold et al. |
| 2010/0310750 A1 | 12/2010 | She et al. |
| 2010/0316769 A1 | 12/2010 | Czarnecki-Maulden et al. |
| 2010/0330229 A1 | 12/2010 | Gelineau et al. |
| 2011/0027417 A1 | 2/2011 | Corrigan et al. |
| 2011/0027419 A1 | 2/2011 | Sunvold et al. |
| 2011/0027420 A1 | 2/2011 | Mehansho |
| 2011/0048251 A1 | 3/2011 | Bardenshtein et al. |
| 2011/0076363 A1 | 3/2011 | Niehues |
| 2011/0086151 A1 | 4/2011 | Plattner et al. |
| 2011/0104327 A1 | 5/2011 | Kirejevas |
| 2011/0111102 A1 | 5/2011 | Saylock |
| 2011/0139087 A1 | 6/2011 | Lang et al. |
| 2011/0159149 A1 | 6/2011 | Josephson et al. |
| 2011/0165304 A1 | 7/2011 | Kortes |
| 2011/0171348 A1 | 7/2011 | Kirejevas |
| 2011/0189367 A1 | 8/2011 | Sagalowicz et al. |
| 2011/0200705 A1 | 8/2011 | Tricarico et al. |
| 2011/0200707 A1 | 8/2011 | Kortes |
| 2011/0250326 A1 | 10/2011 | Cheuk et al. |
| 2011/0256282 A1 | 10/2011 | Piechocki et al. |
| 2011/0257399 A1 | 10/2011 | Akwasi et al. |
| 2011/0268850 A1 | 11/2011 | Rasanayagam et al. |
| 2011/0274808 A1 | 11/2011 | Frantz |
| 2012/0003182 A1 | 1/2012 | Abderrahim et al. |
| 2012/0003340 A1 | 1/2012 | Malnoe et al. |
| 2012/0021094 A1 | 1/2012 | Sunvold et al. |
| 2012/0141643 A1 | 6/2012 | Davidek et al. |
| 2012/0164022 A1 | 6/2012 | Muginstein et al. |
| 2012/0171336 A1* | 7/2012 | Dixon .................. A23K 50/48 426/92 |
| 2012/0177785 A1 | 7/2012 | Pibarot et al. |
| 2012/0183654 A1 | 7/2012 | Zorich |
| 2012/0213889 A1 | 8/2012 | Chiang |
| 2012/0288608 A1 | 11/2012 | Zicker et al. |
| 2013/0064726 A1 | 3/2013 | Morfill et al. |
| 2013/0122154 A1 | 5/2013 | Villagran et al. |
| 2013/0129905 A1 | 5/2013 | Deak |
| 2013/0209614 A1 | 8/2013 | Doare-Broux et al. |
| 2013/0251792 A1 | 9/2013 | Kowalski et al. |
| 2013/0309357 A1 | 11/2013 | Mercenier et al. |
| 2013/0309384 A1 | 11/2013 | Villagran et al. |
| 2013/0330455 A1 | 12/2013 | Buxmann et al. |
| 2014/0030382 A1 | 1/2014 | Ter Haar |
| 2014/0134306 A1* | 5/2014 | Sakaji .................. A23K 40/20 426/242 |
| 2014/0154390 A1* | 6/2014 | Rayner .................. A23L 13/06 426/589 |
| 2014/0161935 A1 | 6/2014 | Boebel et al. |
| 2014/0170268 A1 | 6/2014 | Graeber et al. |
| 2014/0227386 A1 | 8/2014 | Niceron et al. |
| 2014/0328976 A1 | 11/2014 | Huynh-Ba et al. |
| 2015/0004284 A1 | 1/2015 | Sakoda et al. |
| 2015/0030679 A1 | 1/2015 | Becker et al. |
| 2015/0056347 A1 | 2/2015 | Fournier et al. |
| 2015/0101082 A1 | 4/2015 | Bormashenko et al. |
| 2015/0173397 A1 | 6/2015 | Villagran et al. |
| 2015/0201649 A1 | 7/2015 | Lei |
| 2015/0245639 A1 | 9/2015 | Nakase et al. |
| 2015/0296834 A1 | 10/2015 | Geistlinger |
| 2015/0305371 A1 | 10/2015 | Villagran |
| 2015/0313258 A1 | 11/2015 | Corrigan et al. |
| 2015/0320085 A1 | 11/2015 | Ray |
| 2016/0058033 A1 | 3/2016 | Corrigan |
| 2016/0058813 A1 | 3/2016 | Ozga et al. |
| 2016/0095333 A1 | 4/2016 | Brent |
| 2016/0198741 A1 | 7/2016 | Villagran |
| 2016/0198742 A1 | 7/2016 | Maria |

(56) References Cited

U.S. PATENT DOCUMENTS

| | | |
|---|---|---|
| 2016/0242446 A1 | 8/2016 | Groenewold |
| 2016/0249646 A1 | 9/2016 | Sunvold et al. |
| 2017/0000167 A1 | 1/2017 | Corrigan |
| 2017/0112167 A1 | 4/2017 | Cambou et al. |
| 2017/0172178 A1 | 6/2017 | Corrigan |
| 2017/0176466 A1 | 6/2017 | Alexander et al. |
| 2017/0208838 A1 | 7/2017 | Welz |
| 2018/0110240 A1 | 4/2018 | Mao et al. |
| 2018/0295861 A1 | 10/2018 | Mao et al. |
| 2018/0295862 A1 | 10/2018 | Mao et al. |
| 2018/0368446 A1 | 12/2018 | Allaway et al. |
| 2019/0313666 A1 | 10/2019 | Lignet et al. |

FOREIGN PATENT DOCUMENTS

| | | |
|---|---|---|
| AU | 762464 B2 | 6/2003 |
| CA | 494068 A | 6/1953 |
| CA | 1071011 A | 2/1980 |
| CA | 1103978 | 6/1981 |
| CA | 1131063 | 9/1982 |
| CA | 2486238 | 4/2006 |
| CN | 1437445 A | 8/2003 |
| CN | 1927019 | 3/2007 |
| CN | 101095470 | 1/2008 |
| CN | 101214011 | 7/2008 |
| CN | 101411407 | 4/2009 |
| CN | 101411408 | 4/2009 |
| CN | 101669585 | 3/2010 |
| CN | 101822324 | 9/2010 |
| CN | 101822325 | 9/2010 |
| CN | 101822326 | 9/2010 |
| CN | 101822327 | 9/2010 |
| CN | 101933560 | 1/2011 |
| CN | 101999537 | 4/2011 |
| CN | 102008025 | 4/2011 |
| CN | 102008026 | 4/2011 |
| CN | 102048047 | 5/2011 |
| CN | 102048055 | 5/2011 |
| CN | 102106479 | 6/2011 |
| CN | 102894193 A | 1/2013 |
| CN | 104642721 A | 5/2015 |
| CN | 106360028 A | 2/2017 |
| CN | 106721361 A | 5/2017 |
| CN | 104010521 B | 4/2018 |
| DE | 19958620 A1 | 6/2001 |
| DE | 102004008085 | 9/2005 |
| EP | 0008728 A2 | 3/1980 |
| EP | 0241097 | 10/1987 |
| EP | 0258037 | 3/1988 |
| EP | 0258687 | 3/1988 |
| EP | 0113626 | 10/1988 |
| EP | 0594258 | 1/1999 |
| EP | 1036512 | 9/2000 |
| EP | 1136067 A1 | 9/2001 |
| EP | 1413298 | 4/2004 |
| EP | 1527699 | 5/2005 |
| EP | 1618791 | 1/2006 |
| EP | 1797771 A1 | 6/2007 |
| EP | 1932432 | 6/2008 |
| EP | 2060190 | 5/2009 |
| EP | 2255676 | 12/2010 |
| EP | 1533369 | 3/2011 |
| FR | 2034080 | 12/1970 |
| GB | 799676 | 8/1958 |
| GB | 1312910 | 4/1973 |
| GB | 1465267 | 5/1973 |
| GB | 1433976 | 4/1976 |
| GB | 1461998 | 1/1977 |
| GB | 1486864 | 9/1977 |
| GB | 1572761 | 8/1980 |
| GB | 2041717 | 9/1980 |
| GB | 1583644 | 1/1981 |
| GB | 2205476 | 12/1988 |
| GB | 2223762 | 4/1990 |
| GB | 2357967 | 7/2001 |
| GB | 2359746 | 9/2001 |
| GB | 2332850 B | 11/2002 |
| JP | S48-018062 | 6/1973 |
| JP | S4981563 | 8/1974 |
| JP | S49131858 A | 12/1974 |
| JP | S5257362 A | 5/1977 |
| JP | S57-026551 | 2/1982 |
| JP | S5791153 A | 6/1982 |
| JP | S57206338 | 12/1982 |
| JP | S61212267 | 9/1986 |
| JP | S62296847 | 12/1987 |
| JP | S6359853 | 3/1988 |
| JP | H6443159 | 2/1989 |
| JP | H03206853 A | 9/1991 |
| JP | 06040464 | 2/1994 |
| JP | 06040472 | 2/1994 |
| JP | H0670697 | 3/1994 |
| JP | 06217707 | 8/1994 |
| JP | H07799 | 1/1995 |
| JP | H07184595 A | 7/1995 |
| JP | H10271959 | 10/1998 |
| JP | H11127797 A | 5/1999 |
| JP | 2000-515379 A | 11/2000 |
| JP | 2001226293 A | 8/2001 |
| JP | 2002-523027 | 7/2002 |
| JP | 2004121022 A | 4/2004 |
| JP | 2004123636 A | 4/2004 |
| JP | 2004329019 | 11/2004 |
| JP | 2005304475 A | 11/2005 |
| JP | 2006-511209 A | 4/2006 |
| JP | 2006158265 | 6/2006 |
| JP | 2006-191910 A | 7/2006 |
| JP | 2006180815 | 7/2006 |
| JP | 2008161135 | 7/2008 |
| JP | 2009077651 | 4/2009 |
| JP | 2009-545308 A | 12/2009 |
| JP | 2010088391 | 4/2010 |
| JP | 4674311 B2 | 4/2011 |
| JP | 2013-507122 A | 3/2013 |
| JP | 5545173 B2 | 7/2014 |
| JP | 2014131509 A | 7/2014 |
| KR | 20090100817 | 9/2009 |
| KR | 20100023588 | 3/2010 |
| KR | 20100023594 | 3/2010 |
| RU | 2058083 | 4/1996 |
| RU | 2251364 | 5/2005 |
| SU | 840728 A1 | 6/1981 |
| TW | 201010628 | 3/2010 |
| WO | 8905849 | 6/1989 |
| WO | 1992000942 | 1/1992 |
| WO | 9217072 | 10/1992 |
| WO | 9507090 | 3/1995 |
| WO | 9517103 | 6/1995 |
| WO | 9534214 | 12/1995 |
| WO | 1996036242 A1 | 11/1996 |
| WO | 9702760 | 1/1997 |
| WO | 9711610 | 4/1997 |
| WO | 9716077 | 5/1997 |
| WO | 9742838 | 11/1997 |
| WO | 9843682 | 10/1998 |
| WO | 9909839 | 3/1999 |
| WO | 0010405 | 3/2000 |
| WO | 0018254 | 4/2000 |
| WO | 0041576 | 7/2000 |
| WO | 0047062 | 8/2000 |
| WO | 0059321 | 10/2000 |
| WO | 03009710 | 2/2003 |
| WO | 03018778 | 3/2003 |
| WO | 2004016097 A1 | 2/2004 |
| WO | 2004080198 | 3/2004 |
| WO | 2004071324 | 8/2004 |
| WO | 2004074496 | 9/2004 |
| WO | 2005047255 | 5/2005 |
| WO | 2005070232 | 8/2005 |
| WO | 2005092116 | 10/2005 |
| WO | 2006058373 | 6/2006 |
| WO | 2006064959 | 6/2006 |
| WO | 2006106702 | 10/2006 |
| WO | 2006127744 | 11/2006 |

(56) References Cited

FOREIGN PATENT DOCUMENTS

| WO | 2007060539 | | 5/2007 |
|---|---|---|---|
| WO | 2007/073945 | A1 | 7/2007 |
| WO | 2007100251 | | 9/2007 |
| WO | 2007126990 | | 11/2007 |
| WO | 2008014000 | A1 | 1/2008 |
| WO | 2008092228 | | 8/2008 |
| WO | 2009138577 | | 11/2009 |
| WO | 2010077356 | | 7/2010 |
| WO | 2011/014256 | A2 | 2/2011 |
| WO | 2012008994 | A2 | 1/2012 |
| WO | 2012050603 | A1 | 4/2012 |
| WO | 2014098193 | | 6/2014 |
| WO | 2015004300 | A1 | 1/2015 |
| WO | 2016176465 | A1 | 11/2016 |

OTHER PUBLICATIONS

Morr, et al., "How Much Calcium is in Your Drinking Water?", A Survey of Calcium Concentrations in Bottled and Tap Water and Their Significance for Medical Treatment and Drug Administration, HSS J., Sep. 2006, vol. 2, No. 2, ?pp. 130-135, Abstract.

Phillips-Donaldson, "Making petfood more palatable", http://www.petfoodindustry.com/articles/579makingpetfoodmorepalatable; Accessed on Oct. 29, 2015, 12 pp.

Reynolds, "Steam Cooker Enables Even, Safe Processing", Aug. 9, 2007, p. 1, FoodProductionDaily.com.

Rodenburg, "Horizontal Twin-Shaft Paddle Mixers—The Ultimate Technology", International Aquafeed, Jan./Feb. 2009; p. 32-34.

Saravacos, et al., "Handbook of Food Processing Equipment", Springer International Publishing, Switzerland, Dec. 2016, p. 151, Food Engineering Series, DOI 10.1007/978-3-319-25020-5_4.

Schilling, et al., "Processing Agricultural Residues into Structural Materials: Market Opportunity Analysis", Saginaw Valley State University, Aug. 1, 2006, 11 pages.

Severinghaus, "Where will all the DOGS go?", Iowa Farm Bureau International Trade Analyst, Apr. 7, 2006, 2 pages.

Shahidi, et al., "Food Applications ofChitin and Chitosans", Trends in Food Science and Technology, vol. 10, Jan. 1999, pp. 37-51.

Shurson, "Effect of Feeding DDGS to Companion Animals", Dept. of Animal Science, A Literature Review, University of Minnesota, St. Paul; Accessed on line in Apr. 2008, 4 pages.

Silva, et al., "Alginate Microspheres Prepared by Internal Gelation: Development and Effect on Insulin Stability", International Journal of Pharmaceutical Sciences, Elsevier, Amsterdamn, NL., 311, 1-10 (Mar. 2006).

Singh, et al., "Morphological, Thermal and Rheological Properties of Starches from Different Botanical Sources", Food Chemistry, vol. 81, pp. 219-231, Jun. 2003.

Sinha, et al., "Handbook of Fruits and Fruit Processing", Chapter 12 Novel Food Additives, Jun. 2012 (2 pgs.).

Song, et al., "Evaluation of Atmospheric Pressure Plasma to Improve the Safety of Sliced Cheese and Ham Inoculated by 3-Strain Cocktail Listeria monocytogenes", Food Microbiology, vol. 26, No. 4 (Mar. 2009), pp. 432-436.

Srichuwong, et al., "Starches from Different Botanical Sources: Contribution of Amylopectin Fine Structure to Thermal Properties and Enzyme Digestibility", Carbohydrate Polymers 60 (Apr. 2005) pp. 529-538.

Stevenson, et al., "Structures and Functional Properties of Starch from Seeds of Three Soybean (Glycine mas (I.) Merr.) Varieties", Starch/Starke 58, Oct. 2006, p. 509-519.

Teshima, et al., "Yeast Extract in Dog Food: Digestibility and Palatability", Brazilian Zootechny Society, Unesp-Jaboticabal 24-27, Jul. 2007, 3 pages.

Ubbink, et al., "Physical Approaches for the Delivery of Active Ingredients in Foods", Trends in Food Science & Technology, 17 (Jan. 2006), pp. 244-254.

Vandenberg, et al., "Factors Affecting Protein Release from Alginate-Chitosan Coacervate Microcapsules During Production and Gastric/Intestinal Simulation", Journal of Controlled Release, 77 (Oct. 2001) pp. 297-307.

Vandeputte, et al., "From Sucrose to Starch Granule to Starch Physical Behavior: A Focus on Rice Starch", Carbohydrate Polymers, 58 (Jun. 2004) 245-266.

Wetzel, et al., "Instrumental Methods in Food and Beverage Analysis", Elsevier, May 1998, p. 62-63.

Xu, et al., "Compaction of Corn Distillers Dried Grains", AACC International, Inc., Cereal Chemistry, Apr. 2008, 85(2): 158-164.

Youssef, et al., "Field Evaluation of a Dog Owner, Participation-based, Bait Delivery System for the Oral Immunization of Dogs Against Rabies in Tunisia", American Journal of Tropical Medicine and Hygiene, Jun. 1998, vol. 58, No. 6, pp. 835-845.

Zobel, "Molecules to Granules: A Comprehensive Starch Review", starch/starke 40 (1988) Nr. 2, S. pp. 44-50 (Manuscript: Jun. 19, 1987).

"Chicken Flavour Gravy," GNPD, Mintel, http://www.gnpd.com/sinatra/recordpage/535936/from_search/HxraPxcAb8/, Jan. 5, 2006, 2 pages.

"Veal and Chicken Meat in Jelly for Puppies," GNPD, Mintel, http://www.gnpd.com/sinatra/recordpage/2922093/from_search/HxraPxcAb8/, Jan. 1, 2015, 4 pages.

Bake Info, Starch, published Feb. 23, 2014, accessed on Mar. 20, 3030, available at https://web.archive.org/veb/20140223073854/https://www.bakeinfo.co.nz/Facts/Bread-making/Bread-ingredients/Starch (Year 2014), 2 pages.

Burkhalter, et al., The Ratio of Insoluble to Soluble Fiber Components in Soybean Hulls Affects Ileal and Total Tract Nutrient Digestibilities and Fecal Characteristics of Dogs, J. Nutr. Jul. 2001, 131(7), pp. 1978-1985.

Dale, "Algae, an ingredient to be found in pet foods," Steve Dale CABC, http://stevedalepetworld.com/algae-ingredient-found-pet-foods, Sep. 15, 2016, pp. 1-4.

Fahey, et al., Dietary fiber for dogs: I. Effects of Graded Levels of Dietary Beet Pulp on Nutrient Intake, Digestibility, Metabolizable Energy and Digesta Mean Retention Time, J. Anim. Sci., Dec. 1990, 68(12):4221-4228.

Hainzl, et al., Fipronil Insecticide: Novel Photochemical Desulfinylation with Retention of Neurotoxicity, Proc. Natl. Acad. Sci USA, vol. 93, pp. 12764-12767, Nov. 1996.

Hegenbart, Scott, Exploring Dimensions in Intermediate Moisture Foods, www.foodproductdesign.com, Jul. 1993, 7 pages.

Ibrahim, et al., Toxicity, Repellency and Horizontal Transmission of Fipronil in the Formosan Subterranean Termite (Isopter Thinotermitidae), Journal of Economic Entomology, 96(2):461-467, Apr. 2003.

Jezek, et al., Production of soluble Dietary Fibres from Sugar Beet Pulp with Betanaza T Enxzyme in the Extrusion Process, Cehmical and Biochemical Engineering Quarterly, Mar. 1996, 10(3), 103-106.

Matsuda, et al., Role of Loop D of the Alpha 7 Nicotinic Acetylcholine Receptor in its Interaction with the Insecticide Imidacloprid and Related Neonicotinoids, British Journal of Pharmacology, Jul. 2000, 130, 981-986.

Ogoshi, et al., Acidifying and Yeast Extract in Diets for Adult Cats, Animal Science Journal, Jan. 2014, 85, 555-561.

Report of the Japanese Devil's Tongue Assn. No. 85, Aug. 5, 1977, 3 pgs.

Rouchaud, et al., "Imidacloprid Insecticide Soil Metabolism in Sugar Beet Field Crops," Bulletin of Environmental Contamination and Toxicology, 56:29-36 (1996).

Sunvold, et al., Dietary Fiber for cats: in vitro Fermentation of Selected Fiber Sources by Cat Fecal Inoculum and in vivo Utilization of Diets Containing Selected Fiber Sources and their Blends, Journal of Animal Science, Aug. 1995, 73:2329-2339.

Taoukis, et al., Intermediate Moisture Foods, http://www.fsci.umn.edu/Ted_Labuza/papers/IMF.pdf (1988), 22 pgs.

Wilson, et al., Lufenuron, a Chitin-Synthesis Inhibitor, Interrupts Development of *Drosophila melanogaster*, J. Exp. Zool, May 1997, 278(1):37-44.

"What is a Palatant?" downloaded from www.palatant.com on Apr. 1, 2016, 1 pg.

(56) References Cited

OTHER PUBLICATIONS

Glycemic Index and Glycemic Load for 100+ Foods—Harvard Health Publications, http://www.health.harvard.edu/newsweekGlycemic_index_and_glycemic_load_for_100_foods, Mar. 22, 2012, 3 pp.
US FDA Bacteriological Analytical Manual, Appendix 2, Most Probably Number from Serial Dilutions, US FDA Bacteriological Analytical Manual, Appendix 2, Most Probably Number from Serial Dilutions, Oct. 2010, 28 pgs.
"AAFCO Dog and Cat Food Nutrient Profiles", Association of American Feed Control Officials Incorporated, Nov. 2014, 24 pages.
"All Bran Yogurt Bites Cereal", Product Picture downloaded from www.amazon.com, accessed Mar. 11, 2014, 1 pg.
"Bright Hub Engineering, Twin Shaft Paddle Mixer", Available at: http://www.brighthugengineering.com/manufacturing-technology/57380-twin-shaft-paddle-mixer/; published on Nov. 26, 2009, 6 pgs.
"Definition soya bean", Dictionary of food: International food and cooking terms from A to Z, London, UK: A&C Black, 2005, retrieved from http://search.credoreference.com/content/entry/acbdictfood/soya_bean/0; 2 pgs.
"Fluorescent Ca2 + Indicators Excited with Visible Light", Life Technologies, Section 19.3, 28 pages, Feb. 20, 2012.
"Forberg Continuous Mixer, Forberg International AS Product Brochure, 4 pages, 2003".
"Glycerine: an overview", downloaded from archived internet file, http://www.aciscience.org/docs//Glycerine—an overview.pdf, dated Dec. 2008, 27 pages.
"How Cereal Giant Kellogg's Keeps Its Product Pipeline Fresh", US News and World report, posted on May 7, 2006, http://www.usnews.com/usnews/bixtech/articles/060515/15best_print.htm, 6 pgs.
"Iams ProActive Health Adult MiniChunks", Retrieved from URLhttps://web.archive.org/web/20111012222233/http://www.iams.com/dog-food/iams-proactive-health-adult-minichunks>, published Oct. 12, 2011, as per Wayback Machine, 4pp.
"International Vegetarian Union—FAQ", http://www.ivu.org/faq/gelatine.html, updated Aug. 14, 2004, 1 page.
"Introduction, Draft Definition and Classification of Commodites", Food and Agriculture Organization of the United Nations, Introduction, available at: www.fao.org/es/faodef/faodefe.htm; Nov. 29, 2009, 5 pgs.
"Italian Seasoning Recipe", Accessed at http://allrecipes.com/recipe/34450/italian-seasoning-l/, Oct. 5, 2003, 2 pgs.
"Kibbles 'n Bits", http://www.kibblesnbits.com/varieties/brushingbites.aspx, downloaded Dec. 11, 2008, 2 pgs.
"Lipids and Fats" from http://food.oregonstate.edu/learn/fat.html—downloaded Apr. 22, 2014, 11 pages.
"Low Fat Bread Crumb", Accessed at http://www.food.com/recipe/low-fat-bread-crumb-chicken-329993, Oct. 10, 2008, 4 pgs.
"Nutrient Profiles for Dog Foods", Association of American Feed Control Officials Incorporated, pp. 110-119, 1994.
Allen, et al., "Evaluation of Byproduct Feedstuffs as Dietary Ingredients for Dogs", University of Illinois, Journal of Animal Science, vol. 53, No. 6, Oct. 1981, pp. 1538-1544.
Anal, et al., "Chitosan-Alginate Mulitilayer Beads for Controlled Release of Ampicillin", International Journal of Pharmaceutics, 290 (Jan. 2005), pp. 45-54.
Anon, "RD207031A", Jul. 1981, 2 pp.
Bazerque, et al., "Secretion of Calcium by the Salivary Glands in the Dog", Journal of Dental Research, Mar. 1, 1967, vol. 16, p. 446-451.
Biourge, et al., "The Use of Probiotics in the Diet of Dogs", Journal of Nutrition, 128:2730S-2732S, Dec. 1998, American Society for Nutritional Sciences.
Burdick, et al., "Heating by Microwave, Hot Air, and Flowing Stream to Eliminate Inoculated *Salmonella*", Poultry Feed Magazine, Poultry Science, 62:1780-1785, published Jan. 6, 1983.
Burdock, "Encyclopedia of food and color additives p. ", Encyclopedia of food and color additives, Nov. 26, 1996 p. 967-968.
Burdock, et al., "Safety assessment of 2-ethyl-3,(5 or 6) dimethylpyrazine as a food ingredient", Regulatory Toxicology and Pharmacology 50 (Jan. 2008) p. 303-312.

Carciofi, et al., "Effects of Six Carbohydrate Sources on Dog Diet Digestibility and Post-Prandial Glucose and Insulin Responses", Journal of Animal Physiology and Animal Nutrition, vol. 92, pp. 326-336, Mar. 13, 2008.
Chevanan, et al., "Effect of DDGS, Moisture Content, and Screw Speed on Physical Properties of Extrudates in Single-Screw Extrusion", AACC International, Inc., Cereal Chem. 85(2): 132-139, 2008.
Darpro Solutions, "Chicken Fat", Retrieved Mar. 30, 2015, 3 pgs.
De-Oliveria, et al., "Effects of Six Carbohydrate Sources on Diet Digestibility and Postprandial Glucose and Insulin Responses in Cats", J. Anim. Sci., vol. 86, pp. 2237-2246, May 2, 2008.
Fabra, et al., "Barrier properties of sodium caseinate films as affected by lipid composition and moisture content", Journal of Food Engineering, 2012, 109, 372-379 (Accepted Nov. 16, 2011).
Fennema, Food Chemistry, Third Edition, Marcel Deccker, Inc., New York, New York, 1996, p. 954.
Field, et al., "Characteristics of Mechanically Deboned Meat, Hand Separated Meat and Bone Residue from Bones Destined for Rendering", J. Anim. Sci., Sep. 1976, 43:755-762.
Foster, et al., "Dog Food Standards by the AAFCO", Dog Food Standards by the AAFCO, Veterinary & Aquatic Services Department, Drs. Foster & Smith, published 2008, 3 pgs.
Foster, et al., "How Pet Foods are Manufactured", Downloaded from http://web.archive.org/web/20100211002124/http://peteducation.com/article.cfm?c=1+2243+2244&aid=2653, dated Feb. 2010, 3 pages.
Foster-Powell, et al., "International Table of Glycemic Index and Glycemic Load Values", Am. J. Clin. Nutr., vol. 75 pp. 5-56, Jul. 2002.
Francis, "Extrusion Cooking", Encyclopedia of Food Science and Technology, 2nd Ed. Sep. 1999, vol. 2, pp. 702-703.
Frankel, et al., Lipid Oxidation, 2nd Edition, Feb. 2005, the Oily Press, 3 pages.
Hallstrom, et al., "A Novel Wheat Variety with Elevated Content of Amylose Increases Resistant Starch Formation and may Beneficially Influence Glycaemia in Healthy Subjects", Food & Nutrition Research, Aug. 22, 2011 p. 7074.
Hoag, et al., "The Impact of Formulation on Bioavailability: Summary of Workshop Discussion", Bioavailability of Nutrients and Other Bioactive Components from Dietary Supplements, The Journal of Nutrition, 131: 1389S-1391S, Apr. 2001.
Huguet, et al., "Hemoglobin Encapsulation in Chitosan/Calcium Alginate Beads", Journal of Applied Science, vol. 51, pp. 1427-1432 (Jan. 1994).
Kulisic, et al., "Antioxidant Activity of Acqueous Tea Infusions Prepared from Oregano, Thyme and Wild thyme", Food Technol. Biotechnol., 44(4), pp. 485-492 (2006) (Accepted Oct. 26, 2005).
Langhauser, "Impact of Feed & Fuel on Poultry Production", Special Report: Poultry & Feed, Food Manufacturing Jan. 2008, pp. 16-18.
Langley, et al., "Secretion of Calcium and Phosphate by the Dog Parotid Gland", Department of Physiology, University of Alabama Medical Center, Apr. 26, 1961, pp. 599-602.
Lemmon, "Thermophysical Properties of Fluid Systems", NIST Chemistry WebBook, NIST Standard Reference Database No. 69, Eds. P. J. Linstrom and W. G. Mallard, National Institute of Standards and Technology, Gaithersburg Md., 20899 (http://webbook.nist.gov), 3 pgs., Mar. 2003.
Levenspiel, "Chemical Reaction Engineering", 3rd Ed., John Wiley & Sons, Ch. 11, Basics of Non-Ideal Flow, pp. 257-282, 293-320, 660-661, 1999.
Li, et al., "Relationships Between Thermal, Rheological Characteristics and Swelling Power for Various Starches", Journal of Food Engineering, vol. 50, pp. 141-158, Dec. 2001.
Mehyar, et al., "Characterization of Edible Coatings Consisting of Pea Starch, Whey Protein Isolate, and Carnauba Wax and their Effects on Oil Rancidity and Sensory Properties of Walnuts and Pine Nuts", Journal of Food Science, Feb. 2012, 77(2), pp. 52-59.
Meunier, et al., "Use of Rotary Fluidized-bed Technology for Development of Sustained-Release Plant Extracts Pellets: Potential Application for Feed Additive Delivery,", J. Anim. Sci. May 2006, pp. 1850-1859.

(56) References Cited

OTHER PUBLICATIONS

Teshima, et al., "Yeast Extract in Dogs Feeding: Digestibility and Palatability", 44th Annual Meeting of the Brazilian Zootechny Society, Unesp-Jaboticabal 24-27, Jul. 2007, 3 pages.

\* cited by examiner

PROCESS OF PREPARING A WET PET FOOD, WET PET FOOD PRODUCED BY THE PROCESS AND USES THEREOF

CROSS-REFERENCE TO RELATED APPLICATIONS

This application is a national stage application, filed under 35 U.S.C. § 371, of International Application No. PCT/US2016/029814, filed Apr. 28, 2016, which claims priority to European Patent App. Serial No. 15165413.4, filed on Apr. 28, 2015, the entire contents of each being incorporated by reference herein for any and all purposes.

FIELD

A process of preparing a sterilized wet pet food product with improved palatability is provided. Methods of using the sterilized wet pet food product for feeding a companion animal such as a cat or a dog are also provided.

BACKGROUND

Pet food is commonly categorized on the basis of its moisture content:
(1) Dry or low moisture content products (typically less than 15%). These products typically combine high nutritional content with convenience;
(2) Wet or high moisture content products (greater than about 50%). These products are generally most palatable to pets;
(3) Semi-moist or semi-dry or soft dry or intermediate or medium moisture content products (generally between 15 and 50%).

Two main types of wet pet food products are distinguished. The first type is known as 'pate' or 'loaf' and is typically prepared by processing a mixture of edible components under heat to produce a homogeneous semi-solid mass that is structured by heat-coagulated protein. This homogeneous mass is usually packaged into single serve or multi serve packaging which is then sealed and sterilized. Upon packing, the homogeneous mass assumes the shape of the container.

The second type of wet pet food product is known as 'chunk and gravy', 'chunk and jelly' or 'chunk and mousse', depending on the nature of the sauce component. These types of products are referred to herein as 'chunk and sauce' products. The chunks comprise meat pieces or restructured meat pieces. Restructured meat pieces are typically prepared by making a meat emulsion containing a heat-settable component, and by applying thermal energy to 'set' the emulsion and allowing it to assume the desired shape. The product pieces are combined with a sauce (e.g. gravy, jelly or mousse) in single serve or multi serve packaging which is then sealed and sterilized. As opposed to pate or loaf, when served, the chunk and sauce product flows out of the packaging and can be easily mixed with other pet food products.

Many wet pet food products contain considerable amounts of meat and animal by-products. Animal by-products are the entire bodies or parts of bodies of animals or products of animal origin not intended for human consumption, including ova, embryos and sperm. Animal by-products include among others carcasses and body parts of animals, viscera and products or foods of animal origin originally meant for human consumption but withdrawn for commercial reasons.

Reconstitution of low-grade meats, including animal by-products, into aesthetically pleasing restructured meat pieces (chunks) is a key feature of most wet pet food products. A widely used technology relies on the heat setting of meat proteins and the addition of heat-settable binders. Soluble meat proteins coagulate and create a strong matrix when heated above 80° C. For pet food production, however, it is difficult to find suitable meats at a realistic price. Hence, additives such as dried blood plasma and other heat setting binders are included to give sufficient chunk strength.

Palatability of wet pet food products containing restructured meat pieces is not optimal. Consequently, it has been suggested to improve the palatability of such pet food products by adding seasoning and/or flavouring.

US 4,070,490 describes a process for preparing a liver-like pet food which comprises:
preparing an aqueous reaction mixture of emulsified fat, whole blood, and a reducing sugar; and
heating the reaction mixture for a time and at a temperature effective to solidify the mixture and produce a textured, liver-like material.

The examples describe the preparation of liver-like pet food from a mixture comprising tallow, water, dried blood, glucose and yeast extract.

US 2010/0330229 describes a method for preparing a palatability enhancer for use in pet foods of low, medium or high moisture content, comprising at least:
a) providing a first stage reaction product obtained by: (i) reacting with at least one protease, in the absence of any added lipase, a substrate comprising proteinaceous and fatty materials, (ii) heat-inactivating said protease and filtrating the resulting digest product,
b) optionally adding fat;
c) emulsifying said first stage reaction product;
d) reacting said emulsion with at least one lipase, in the absence of any added protease, so as to obtain a second stage reaction product;
e) adding at least one reducing sugar and at least one nitrogen compound to said second stage reaction product and heating the resulting mixture.

Teshima et al. (*Yeast extract in dog food: digestibility and palatability*, 44$^{th}$ Annual meeting of the Brazilian Zootechny Society, Unesp-Jaboticabal 24-27 Jul. 2007) describe the outcome of experiments in which 2% yeast extract (Nupro® 2000) was added to extruded dog food to replace corn gluten. Dogs were found to prefer the yeast extract containing product over the reference product.

EP-A 0 241 097 describes a liquid food product on dairy basis for cats comprising 1.5-3.5% by weight of lactose and 3.5-5.0% by weight of protein based on the total product, and fat. The examples of the European patent application describe liquid food products containing yeast extract.

WO 2014/098193 describes a pet food comprising:
at least one kind of protein selected from the group consisting of animal proteins and vegetable proteins;
at least one kind of fat or oil selected from the group consisting of animal fats and oils and vegetable fats and oils;
defatted sesame; and
at least one kind of palatability enhancing agent selected from the group consisting of meat extracts, fish extracts, internal organ extracts, yeast extracts, processed milk products and hydrolysates thereof.

SUMMARY

The inventors have discovered that palatability of sterilized wet pet food products containing restructured meat pieces can be improved very significantly by incorporating therein a combination of yeast extract and Maillard component. The Maillard component employed can be a Maillard reaction flavour that contains high levels of Maillard flavour substances and/or a carbonyl compound that is capable of reacting with amino compounds under the formation of Maillard flavour substances.

Accordingly, a process of preparing a sterilized wet pet food product is provided, the process comprising:
a) preparing a meaty mass having a water content of at least 40 wt. % by mixing the following ingredients:
   30-95% by weight of the meaty mass of ground animal material selected from meat, animal by-products and combinations thereof;
   1-40% by weight of the meaty mass of heat settable binder; and
   0-60% by weight of the meaty mass of one or more other pet food components;
b) heating the meaty mass to a temperature of at least 70° C. to heat set the binder and shaping the heated mass into restructured meat pieces;
c) introducing the restructured meat pieces, optionally together with one or more other pet food ingredients, into a package, and sealing the package to produce a packaged wet pet food product;
d) sterilizing the packaged pet food product by heating the product in the package to a temperature of at least 80° C.;
said process further comprising: (i) adding yeast extract before sterilization in a total amount of 0.1-3% by weight of the pet food product; and (ii) adding a Maillard component before sterilization in a total amount of 0.01-5% by weight of the pet food product, said Maillard component being selected from a carbonyl source, a Maillard reaction flavour and combinations thereof, wherein the carbonyl source contains at least 10% by weight of dry matter of carbonyl compound capable of undergoing a Maillard reaction.

A sterilized wet pet food product obtained by the aforementioned process and the use of such a wet pet food product for feeding a companion animal are also provided.

DETAILED DESCRIPTION

A process of preparing a sterilized wet pet food product is provided, the process comprising:
a) preparing a meaty mass having a water content of at least 40 wt. % by mixing the following ingredients:
   30-95% by weight of the meaty mass of ground animal material selected from meat, animal by-products and combinations thereof;
   1-40% by weight of the meaty mass of heat settable binder; and
   0-60% by weight of the meaty mass of one or more other pet food components;
b) heating the meaty mass to a temperature of at least 70° C. to heat set the binder and shaping the heated mass into restructured meat pieces;
c) introducing the restructured meat pieces, optionally together with one or more other pet food ingredients, into a package, and sealing the package to produce a packaged wet pet food product;
d) sterilizing the packaged pet food product by heating the product in the package to a temperature of at least 80° C.;
said process further comprising: (i) adding yeast extract before sterilization in a total amount of 0.1-3% by weight of the pet food product; and (ii) adding a Maillard component before sterilization in a total amount of 0.01-5% by weight of the pet food product, said Maillard component being selected from the group consisting of a carbonyl source, a Maillard reaction flavour and combinations thereof, wherein the carbonyl source contains at least 10% by weight of dry matter of carbonyl compound capable of undergoing a Maillard reaction.

The term "pet" as used herein refers to a domestic animal, including domestic cats and dogs.

The term "pet food" as used herein refers to a food composition designed for ingestion by a pet. The wet pet food product typically is a nutritionally balanced food product to provide a pet with all the essential nutrients it needs in the right quantities.

The term "yeast extract" as used herein refers to a yeast product made by extracting the cell contents from yeast (removing the cell walls).

The term "sauce" as used herein refers to an aqueous composition in the form of a fluid, a paste, a gel or a mousse.

The term "fat" as used herein refers to esters of fatty acids such as triglycerides, diglycerides, monoglycerides and phospholipids.

The term "animal protein" as used herein refers to proteins that originate from vertebrates, such as mammals, fowl and fish. Animal protein may originate, for example, from muscle meat, organs, tendons or bone. Proteins originating from milk or eggs are not considered animal proteins.

The term "flour" or "vegetable flour" as used herein refers to a particulate material that has been prepared by grinding or comminuting a vegetable material, such as cereal grains, beans, other seeds or roots.

The term "vegetable protein" as used herein refers to protein that originates from edible plants or edible plants parts. The term "vegetable protein" encompasses proteins from fruits, grains and nuts.

The term "legume" as used herein refers to a plant in the family Fabaceae (or Leguminosae), or the fruit or seed of such a plant. Well-known legumes include alfalfa, clover, peas, beans, lentils, lupins, mesquite, carob, soybeans, peanuts, and tamarind.

The wet pet food products and the components used therein are selected for consumption by a pet and are not intended for consumption by humans. The wet pet food product preferably is a wet pet food product for cats or dogs. Most preferably, the wet pet food product is a wet pet food product for cats.

The ground animal material that is used in the present process may suitably contain at least 50 wt. %, more preferably at least 70 wt. % and most preferably at least 85 wt. % of animal by-product. Animal by-products are the entire bodies or parts of bodies of animals or products of animal origin not intended for human consumption, including ova, embryos and sperm. Examples of animal by-products include:
parts of slaughtered animals which are fit for human consumption but are not intended for human consumption for commercial reasons;
parts of slaughtered animals which are rejected as unfit for human consumption but are not affected by any sign of a communicable disease;
hides and skins, hooves and horns, pig bristles and feathers originating from animals that are slaughtered in a slaughterhouse and were declared fit for human consumption;
blood obtained from animals declared fit for human consumption;

animal by-products derived from the production of products intended for human consumption, including degreased bones and greaves;

former foodstuffs of animal origin which are no longer intended for human consumption for commercial reasons or due to problems of manufacturing or packaging defects;

raw milk originating from animals that do not show any signs of a communicable disease;

fish or other sea animals, except sea mammals, caught in the open sea for the purpose of fishmeal production, and fresh by-products from fish from plants manufacturing fish products for human consumption;

shells of eggs originating from animals that do not show any signs of a communicable disease;

blood, hides and skins, hooves, feathers, wool, horns, hair and fur originating from healthy animals.

The heat settable binder employed in the present process is preferably selected from blood plasma, egg albumen, cellulose ethers, cereal protein, soy protein, starch and combinations thereof. Wheat protein, especially gluten, is an example of a cereal protein that may suitably be used as a heat settable binder. Starch and cereal protein may be added as such or, for instance, in the form of cereal flour.

The yeast extract that is employed in the wet pet food product may be obtained from different types of yeast, such as *Saccharomyces, Pichia, Kluyveromyces, Hansenula, Candida*. The yeast extract preferably is obtained from a *Saccharomyces* yeast. Even more preferably, the yeast extract comprises, consists essentially of, or consists of yeast extract obtained from *Saccharomyces cerevisiae*. The yeast extract may comprise, consist of, or consist essentially of, extract from two types of yeast selected from the group consisting of *Saccharomyces, Pichia, Kluyveromyces, Hansenula, Candida*. Or, the yeast extract may comprise, consist essentially of, or consist of, extract from three types of yeast selected from the group consisting of *Saccharomyces, Pichia, Kluyveromyces, Hansenula, Candida*. Or, the yeast extract may comprise, consist essentially of, or consist of extract from four types of yeast selected from the group consisting of *Saccharomyces, Pichia, Kluyveromyces, Hansenula, Candida*. Or, the yeast extract may comprise, consist essentially of, or consist of extract from all five of *Saccharomyces, Pichia, Kluyveromyces, Hansenula, Candida*.

In accordance with another preferred embodiment the yeast extract is obtained from yeast that was produced in a brewing process.

The yeast extract employed in the present process typically contains at least 10%, more preferably at least 12% nucleotides by weight of dry matter.

In the present process, yeast extract is preferably added in a concentration of at least 0.2%, or at least 0.4 wt. %, or at least 0.6 wt. %, or at least 0.8 wt. %, or at least 1.0 wt. %, or at least 1.2 wt. %, based upon the weight of the wet pet food product. Yeast extract may be added in a concentration of up to about 3.0 wt. %, or up to about 2.8 wt. %, or up to about 2.6 wt. %, or up to about 2.4 wt. %, based upon the weight of the wet pet food product. In some embodiments, the yeast extract may be included in the wet pet food product in amounts of from 0.2 wt. % to 3.0 wt. %, or from 0.4-2.8 wt. %, or from 0.6 to 2.6 wt. %, or from 0.8 to 2.4 wt. % or from 1.0 wt. %-2.4 wt. % by weight of the wet pet food product.

The yeast extract and the Maillard component are typically added to the wet food product in a weight ratio in the range of 1:2 to 40:1. More preferably, the weight ratio of yeast extract to Maillard component is in the range of 1:1.6 to 15:1, most preferably in the range of 1:1.5 to 10:1.

Other ingredients that may suitably be incorporated in the wet pet food product, in either the restructured meat pieces, the sauce or both, include fat, antioxidants, carbohydrates, seasoning, colourants, flavouring, minerals, preservatives, vitamins, emulsifiers, farinaceous materials and combinations thereof.

The meaty mass obtained in the mixing step typically has a water content of at least 45 wt. %. More preferably, the water content of said meaty mass in the range of 48-80 wt. %, most preferably in the range of 50-75 wt. %.

The present process preferably comprises the addition of taurine. Taurine is an organic acid that is widely distributed in animal tissues and that has many fundamental biological roles. Taurine is an essential dietary requirement for cats and dogs, since they cannot synthesize the compound. Taurine supplementation is a requirement of both the European Pet Food Industry Federation (FEDIAF) and the Association of American Feed Control Officials (AAFCO). The amount of taurine added in the present process preferably is in the range of 0.05% to 1.0% by weight of the wet pet food product, most preferably in the range of 0.1% to 0.5% by weight of the wet pet food product.

Expressed differently, it is preferred that the present pet food product contains 400-2000 mg taurine per 1000 kcal, more preferably 425-1200 mg taurine per 1000 kcal.

The wet pet food product preferably contains added nutrients selected from the group of vitamin B1 (thiamine), vitamin B2 (riboflavin), vitamin B6 (pyridoxine) and combinations thereof. Typically, vitamin B1 is contained in the product in a concentration of 0.1-3.0 mg per 1000 kcal. Vitamin B2 is typically present in a concentration of 0.2-4.0 mg, more preferably of 0.8-2.0 mg per 1000 kcal. Vitamin B6 content is typically in the range of 0.1-2.0 mg per 1000 kcal, more preferably in the range of 0.5-0.9 mg per 1000 kcal.

In accordance with an advantageous embodiment of the present process, the Maillard component that is added is a carbonyl compound. Addition of the carbonyl compound in the present process results in the formation of Maillard flavour substances during the sterilization step as the heating conditions employed during sterilization favour the reaction of the carbonyl compound with amino acids and peptides present in the ground meat and other pet food components (e.g. added amino acids and/or peptides). In other words, the carbonyl compound can be added as a Maillard flavour precursor.

Any carbonyl compound that is capable of undergoing a Maillard reaction by reacting with an amino compound (such as an amino acid) may be used in the present process to form the wet pet food product. In some embodiments, the carbonyl compound is selected from the group consisting of monosacharides, disaccharides, uronic acids and combinations thereof. In such embodiments, the carbonyl compound may even more particularly be selected from the group consisting of pentoses, hexoses, 6-deoxyhexoses, disaccharides, uronic acids and combinations thereof. In yet other embodiments, the carbonyl compound is selected from glucose, sucrose, glucosamine, acetyl glucosamine, galactose, lactose, mannose, maltose, ribose, xylose, lyxose, rhamnose, fucose, cellobiose, arabinose, galacturonic acid and combinations thereof. Most preferably, the carbonyl compound is selected from xylose, glucose, sucrose, rhamnose, lactose, maltose and combinations thereof.

In the present process the carbonyl compound is typically added in a total amount of 0.02-3% by weight of the wet pet food product. More preferably, the carbonyl compound is added in a total amount of 0.1-2.5%, most preferably 0.5-2.3% by weight of the wet pet food product.

The wet pet food product may contain other pet food components that contain endogenous amounts of one or more carbonyl compounds. Typically, the total amount of carbonyl compound in the packaged wet pet food product prior to the sterilizing step is in the range of 0.04-6 wt. %, more preferably of 0.1-3 wt. % and most preferably of 0.5-2.5 wt. %.

According to a particularly preferred embodiment, the present process comprises the addition of the carbonyl compound in concentrated form. Accordingly, the carbonyl compound is preferably added in the form of a concentrate containing at least 20 wt. % of the carbonyl compound. Even more preferably, said concentrate contains at least 50 wt. % and most preferably at least 80 wt. % of the carbonyl compound. Embodiments in which the concentrate containing the carbonyl compound is preblended with other components of the wet pet food product are also contemplated.

Instead or besides adding a carbonyl compound as Maillard flavour precursor, the addition of a Maillard component may suitably comprise the addition of a Maillard reaction flavour, i.e. a flavouring material that contains high levels of Maillard flavour substances and that has been prepared by heating a concentrated reaction mixture containing carbonyl compounds (e.g. reducing sugars) and amino compounds (e.g. amino acids or peptides).

According to a preferred embodiment, the Maillard reaction flavour employed in the present process comprises, consists essentially of, or consist of, one or more of the following Maillard flavour substances in the indicated concentrations:
- at least 20 μg/kg, preferably at least 100 μg/kg of substituted pyrazines selected from 2,3,5-trimethylpyrazine, 2-ethyl-3,5-dimethylpyrazine, 2,3-diethyl-5-methylpyrazine and combinations thereof;
- at least 10 mg/kg, preferably at least 50 mg/kg of substituted thiazoles selected from 2-acetylthiazole, 2-methylthiazole, 4-methylthiazole and combinations thereof;
- at least 5 mg/kg, preferably at least 25 mg/kg of Strecker aldehydes selected from methional, 2-methylbutanal, 3-methylbutanal and combinations thereof;
- at least 30 mg/kg, preferably at least 150 mg/kg of substituted furans and furanones selected from 4-hydroxy-2,5-dimethyl-3(2H)-furanone, 4-hydroxy-5-methyl-3 (2H)-furanone, 3-Hydroxy-4,5-dimethylfuran-2(5H)-one and combinations thereof; and
- at least 10 μg/kg, preferably at least 50 μg/kg of 2-furfurylthiol.

According to another embodiment, the Maillard reaction flavour contains at least two, more preferably at least three of the aforementioned Maillard flavour substances in the indicated concentrations.

In the present process the Maillard reaction flavour is preferably added in a total amount of 0.01-5% by weight of the pet food product. Even more preferably, the Maillard reaction flavour is added in a total amount of 0.05-2.5%, most preferably of 0.1-1.5% by weight of the pet food product.

As explained herein before, carbonyl compounds added in the present process as well as carbonyl compounds endogenously present in pet food components can react with amino compounds during the sterilization step under the formation of Maillard flavour substances. Typically, amino compound selected from proteinogenic amino acids, hydroxyproline, cysteine, ornithine and combinations thereof is present in the wet pet food product before sterilization in a concentration of 0.01-3 wt. %, said amino compound being. More preferably, before sterilization said amino compound is present in the wet pet food product in a concentration of 0.1-2 wt. %, most preferably of 0.5-1.5 wt. %.

The present process comprises adding a source of the amino compound in an amount sufficient to provide a total amount of at least 0.01% by weight of the pet food product, said source of the amino compound containing at least 5% of the amino compound by weight of dry matter.

The amino compound employed in the present process may be an amino acid selected from cysteine, methionine, proline, arginine, valine, leucine, isoleucine, phenylalanine, lysine, glycine, glutamic acid, threonine and combinations thereof. In some embodiments, the amino compound is an amino acid selected from cysteine, glycine, methionine, proline, leucine, phenylalanine, glutamic acid and combinations thereof.

The one or more restructured meat pieces that are prepared in the present process may be solid or semi-solid, and in some embodiments may preferably be semi-solid. The restructured meat pieces typically have a density of 0.8-1.2 g/ml, or of 0.85-1.15 g/ml, or of 0.9-1.1 g/ml.

The restructured meat pieces produced in the present process typically have a fat content of less than 15 wt. %. More preferably, said restructured meat pieces have a fat content in the range of 2 to 12 wt. %, most preferably of 4 to 10 wt. %.

The fat that is contained in the restructured meat pieces preferably contains at least 50 wt. %, more preferably at least 70 wt. % of triglycerides. The fat may suitably contain animal fat, vegetable oil, marine oil and combinations thereof. According to one embodiment, the fat contains at least 10 wt. %, or at least 30 wt. % or even at least 50 wt. % of an animal fat. The animal fat preferably originates from an animal selected from cattle, pigs, sheep, goat, poultry, fish and combinations thereof.

The protein content of the restructured meat pieces produced in the present process may desirably be in the range of 5-50 wt. %, or from 10-45 wt. % or from 20-42 wt. %.

The protein in the restructured meat pieces may contain at least 5 wt. % of animal protein by weight of the total amount of protein that is contained in the restructured meat pieces. In some embodiments, animal protein constitutes 8-50 wt. %, or 10-30 wt. % of the total amount of protein that is present in the restructured meat pieces.

The animal protein is preferably selected from muscle meat protein, organ protein and combinations thereof. The animal protein preferably originates from vertebrates selected from mammals, fowl, fish and combinations thereof; most preferably selected from cattle, pigs, sheep, goat, rabbit, poultry, fish and combinations thereof.

The restructured meat pieces prepared in the present process may suitably be shaped in the form of a loaf (or pate) product and be packaged as a single piece in a container, such as a can, a pouch or a tray, followed by sterilization. Typically, these shaped pieces have a piece volume of 20-2,000 cm$^3$, more preferably of 40-1,500 cm$^3$, most preferably of 50-1,000 cm$^3$.

Typically, the sterilized packaged wet pet food product so obtained contains 90-100 wt. % of the one or more restructured meat pieces, more preferably at least 95 wt. %, most preferably at least 98 wt. % of the one or more meat pieces.

In an alternative embodiment of the present process the restructured meat pieces are combined with sauce before the sealing of the package to prepare a chunks-and-gravy or a chunks-and-jelly or a chunk-and-mousse type of product. The restructured meat pieces may be combined with the sauce before introduction into the package. Alternatively, these two components may be introduced in the package successively. Preferably, 30-90 wt. % of the restructured meat pieces are combined with 10-70 wt. % of the sauce to produce the wet pet food product. Together, the restructured meat pieces and the sauce typically constitute at least 80 wt. %, more preferably at least 90 wt. % of the wet pet food product.

The sauce that is optionally introduced into the wet pet food product typically contains at least 80 wt. % water. More preferably, the water content of the sauce is in the range of 90-98 wt. %, most preferably in the range of 93-97 wt. %.

The sauce employed in the present process preferably is an aqueous fluid, a jelly, a paste or a mousse. Gelling biopolymers that may suitably be employed to prepare gelled sauce include carrageenan, xanthan, guar gum, cassia gum, starch, gelatine and combinations thereof.

The wet pet food product of the present invention may solely consist of restructured meat pieces. In such embodiments, the yeast extract will be a component of the restructured meat pieces. In other embodiments, the wet pet food product comprises restructured meat pieces in combination with sauce, and in such embodiments, the yeast extract may be a component of the restructured meat pieces and/or the sauce. Preferably, yeast extract is added to the sauce before it is combined with the restructured meat pieces. Typically, the bulk of the components present in the yeast extract will end up in both the restructured meat pieces and the sauce independent of whether the yeast extract was initially incorporated in the restructured meat pieces or the sauce.

In a particularly preferred embodiment, the Maillard component is introduced into the wet pet food products as part of the sauce component. Accordingly, it is preferred that the restructured meat pieces are combined with sauce before the sealing of the package and that the sauce contains at least 0.02 wt. %, more preferably 0.1-5 wt. % and most preferably 0.2-4 wt. % of the Maillard component. The sauce advantageously contains at least 0.02 wt. %, more preferably 0.04-5 wt. % and most preferably 1-4 wt. % of the carbonyl compound.

In accordance with another preferred embodiment, the restructured meat pieces are combined with sauce before the sealing of the package and the sauce contains at least 0.05 wt. %, more preferably 0.1-4 wt. % and most preferably 0.5-3 wt. % of the amino compound. According to a particularly advantageous embodiment the sauce contains at least 1.5 wt. % of the carbonyl compound and at least 0.8 wt. % of the amino compound.

In one embodiment of the present process the restructured meat pieces are produced by a low temperature heat-setting process comprising:
  emulsifying the meaty mass to form a meaty emulsion;
  forming a layer of the meaty emulsion;
  heating the layer of meaty emulsion to a temperature of 70-105° C. to set the heat-settable binder; and
  cutting or shredding the heat-set layer into discrete restructured meat pieces.

In this embodiment of the present process the meaty mass is preferably prepared by mixing the following ingredients:
  50-90% by weight of the meaty mass of ground animal material selected from meat, animal by-products and combinations thereof;
  1-15% by weight of the meaty mass of heat settable binder; and
  0-40% by weight of the meaty mass of one or more other pet food components.

The heat settable binder that is employed in the low temperature heat setting process is preferably selected from blood plasma, egg albumin, cellulose ether and combinations thereof. Even more preferably, the heat settable binder used in the low temperature heat setting process is blood plasma, most preferably dried blood plasma.

The restructured meat pieces that are produced by the low temperature heat-setting process may suitably contain vegetable flour. The inventors have found that the palatability enhancing effect of the combined use of yeast extract and Maillard component is particularly pronounced in case the restructured meat pieces contain a significant amount of vegetable flour. Accordingly, in some embodiments, the restructured meat pieces contain 2-20 wt. % flour, more preferably 3-13 wt. % vegetable flour, most preferably 4-10 wt. % vegetable flour.

In such embodiments, the wet pet food product preferably contains yeast extract and vegetable flour in a yeast extract: vegetable flour weight ratio in the range of at least 1:20, or from 1:15, or from 1:10, or from 1:5, or from 1:1. In some embodiments, the weight ratio of yeast extract to vegetable flour is from 1:20 to 1:12, or from 1:20 to 1:13 or from 1:20 to 1:14 or from 1:20 to 1:15. In other embodiments, the weight ratio of yeast extract to vegetable flour may be in the range of 1:7 to 1:1, or from 1:6 to 1:1, or from 1:5 to 1:1.

The combined amount of protein and starch that is contained in the vegetable flour that is employed typically is at least 60 wt. %, more preferably at least 65 wt. % and most preferably at least 70 wt. %.

The vegetable flour employed in the meaty mass preferably contains at least 50 wt. % starch, more preferably at least 60 wt. % starch, most preferably at least 65 wt. % starch.

The vegetable flour is preferably obtained from cereal, legume or both. Wheat flour is an example of a cereal flour that can be used. Examples of legume flours include soy flour and pea flour.

Vegetable flour is preferably used in the preparation of the meaty mass in such an amount that vegetable protein (including vegetable protein from other sources) constitutes at least 10% by weight of the total amount of protein that is contained in the meaty mass. More preferably, vegetable protein constitutes 12-50 wt. %, most preferably 15-35 wt. % of all the protein that is contained in the meaty mass.

Due to the heat treatment that is used in the preparation of the restructured meat pieces to set the heat settable binder, the starch contained in the restructured meat pieces is at least partially gelatinized before the sterilization step. Accordingly, in a preferred embodiment, the restructured meat pieces contain gelatinized starch before said sterilization.

In another embodiment of the present process the restructured meat pieces are produced by a high temperature heat-setting process, said process comprising:
  preparing the meaty mass by mixing the following ingredients:
    30-80% by weight of the meaty mass of ground animal material selected from meat, animal by-products and combinations thereof.
    15-40% by weight of the meaty mass of heat settable vegetable protein (=heat settable binder) selected from cereal protein, soy protein and combinations thereof and
    0-40% by weight of the meaty mass of one or more other pet food components;

heating the meaty mass to a temperature of at least 110° C. for 0.1-5 minutes to coagulate the non-animal protein; and shaping the heated mass into restructured meat pieces.

Examples of heat settable vegetable proteins that may be employed in the high temperature heat-setting process include proteins obtained from wheat, corn, pea, soya, rice or from a combination of these vegetables. Most preferably, the heat settable vegetable protein is selected from gluten, soy protein and combinations thereof.

In the high temperature heat-setting process the meaty mass is preferably prepared by combining the ground animal material with 18-35 wt. % of heat-settable vegetable protein. The total protein content of the meaty mass preferably lies in the range of 15-50 wt. %, more preferably of 20-42 wt. % and most preferably of 25-38 wt. %.

The inventors have found that the palatability enhancing effect of the combined use of yeast extract and Maillard component is particularly pronounced in case the restructured meat pieces contain a relatively high amount of vegetable protein, including heat settable vegetable protein. Accordingly, in a preferred embodiment, the restructured meat pieces obtained in the high temperature heat-setting process contain, calculated by weight of the total amount of protein contained in the restructured meat pieces, at least 50 wt. %, more preferably 60-95 wt. % and most preferably 70-90 wt. % vegetable protein.

The heat settable vegetable protein is suitably introduced into the meaty mass in the form of a vegetable protein concentrate. Here the term "vegetable protein concentrate" refers to a material that is extracted or prepared from vegetable matter and that is enriched in protein relative to the original vegetable matter. The term "vegetable protein concentrate" encompasses vegetable protein isolates, such a soy protein isolate and gluten. Typically, the vegetable protein concentrate has a protein content of at least 30 wt. %, more preferably of at least 50 wt. % and most preferably of at least 70 wt. %.

The shaping of the heated mass into restructured meat pieces may suitably be achieved by expelling the heated mass through a die and cutting or otherwise breaking up the expelled mass, optionally after said mass has been allowed to cool down. Shaping of the heated mass may also be achieved by introducing the heated mass into a container, e.g. a can, and allowing the heated mass to cool down within said container.

By heating the meaty mass to a temperature of at least 110° C. the heat settable vegetable protein in the mass can be coagulated to form a firm structure in less than 5 minutes. Typically, the pressures employed at these heating temperatures exceed 5 bar. More preferably, the pressure employed is in the range of 6-90 bar. The combination of high temperature and high pressures provide fiber definition to the product.

In the high temperature heat-setting process the meaty mass is preferably rapidly heated to elevated temperatures through rapid mechanical heating and/or steam injection. According to a particularly preferred embodiment, the meaty mass is heated to a temperature of at least 120° C. and most preferably of 130-240° C. While the period of time required for the protein mass to set sufficiently to form a firm product depends on a number of factors, such as the temperature to which the emulsion is heated and the amount and type of protein in the emulsion, a residence time of 0.5-4 minutes at a temperature of at least 130° C. is generally sufficient. Preferably, said residence time is in the range of 1-3 minutes.

After the heated mass has been shaped into pieces of restructured meat pieces, the size of these pieces may be reduced further by e.g. shredding or milling. Especially in case the process is used to prepare a wet pet food product that contains restructured meat pieces as well as sauce, it is preferred to employ an additional size reduction step in which the size of the restructured meat pieces is reduced by at least a factor 2, more preferably by at least a factor 4.

The packaged pet food product is preferably sterilized by heating the product in the package for at least 5 minutes to a temperature of at least 90° C. Even more preferably, the packaged product is sterilized by means of retort sterilization. Typically, a retorting temperature of 105° C. to 150° C., especially 115° C. to 140° C. yields a satisfactory result. Heating times at these retorting temperatures typically are in the range of 10-120 minutes, most preferably 15-60 minutes.

A sterilized wet pet food product obtained by a process as described herein is also provided.

The sterilized wet pet food product comprises, consists essentially of, or consists of one or more Maillard flavour substances at concentration levels that affect the flavour profile and thereby the palatability of the product. Accordingly, in a preferred embodiment, the wet pet food product comprises, consists essentially of, or consists of one or more of the following Maillard flavour substances in the indicated concentrations:

at least 2 μg/kg of substituted pyrazines selected from 2,3,5-trimethylpyrazine, 2-ethyl-3,5-dimethylpyrazine, 2,3-diethyl-5-methylpyrazine and combinations thereof;

at least 1.7 mg/kg of substituted thiazoles selected from 2-acetylthiazole, 2-methylthiazole, 4-methylthiazole and combinations thereof;

at least 0.45 mg/kg of Strecker aldehydes selected from methional, 2-methylbutanal, 3-methylbutanal and combinations thereof;

at least 1.5 mg/kg of substituted furanones selected from 4-hydroxy-2,5-dimethyl-3(2H)-furanone, 4-hydroxy-5-methyl-3(2H)-furanone, 3-Hydroxy-4,5-dimethyl-furan-2(5H)-one and combinations thereof.

at least 0.6 μg/kg of 2-furfurylthiol.

According to one embodiment, the wet pet food product comprises, consists essentially of, or consists of, at least two or more, even more preferably three or more of the aforementioned Maillard flavour substances in the indicated concentrations.

The process of making the wet pet food product may suitably be conducted without any step which is not specifically disclosed herein. Similarly, the wet pet food product described herein may suitably be prepared without any ingredient or component which is not specifically disclosed herein.

Use of the aforementioned wet pet food product for feeding a companion animal, such as a cat or a dog is also contemplated. In some advantageous uses, the wet pet food product is used to feed cats.

Some embodiments will now be described in detail in the following non-limiting examples.

EXAMPLE 1

Restructured meat pieces for a wet cat food product were prepared on the basis of the recipe shown in Table 1.

TABLE 1

| Ingredient | Wt. % |
| --- | --- |
| Animal by-product | 46.45 |
| Water | 19.32 |
| Calcium carbonate | 0.75 |
| Minerals | 0.54 |
| Wheat gluten[1] | 32.94 |

[1]protein content 75 wt. %

The nutritional composition of the restructured meat pieces prepared on the basis of this recipe is depicted in Table 2.

TABLE 2

| Ingredient | Wt. % |
| --- | --- |
| Protein | 39.1 |
| Fat | 4.9 |
| Carbohydrate | 4.0 |
| Water | 49.2 |
| Remainder | 2.7 |

The restructured meat pieces were prepared by grinding the frozen animal by-products. After grinding, the mix of meat particles was conveyed to a mixing tank in which the meat was mixed until uniform, and was heated to facilitate pumping of the meat mix. The uniform mix of ground meat particles was then comminuted under conditions which emulsify the meat material and form a meat emulsion in which the protein and water of the meat mixture form a matrix that encapsulates the fat globules.

The temperature of the meat mixture during emulsification was maintained below 50° C. in order to minimize protein denaturation. The wheat protein, calcium carbonate and minerals were added to the meat mix after emulsification of the meat.

The viscous meat emulsion so obtained had a temperature of about 35° C., and was heated in a twin-screw extruder to about 136° C.

The hot meat emulsion, was transferred with a positive displacement pump to a holding tube. The product was pumped at a pressure in excess of 7 bar into the processing zone. The emulsion was retained in the holding tube at a pressure above the vapor pressure of the emulsion until the protein in the meat emulsion had coagulated sufficiently to set the emulsion and form a firm emulsion product, which retained its shape and structure when discharged from the holding tube.

The set meat emulsion discharged from the confined processing zone had a temperature of 98-100° C. and was cut suing a rotary cut-off knife that was mounted at the discharge end of the holding tube. Upon discharge from the processing zone, the chunks of restructured meat were rapidly cooled by evaporating cooling to a temperature in the range of about 88° C. and were allowed to cool down to ambient temperature.

Next, the chunks of restructured meat were combined with two different jellies having the composition described in Table 3.

TABLE 3

| | Wt. % | |
| --- | --- | --- |
| Ingredient | Control | Product 1 |
| Water | 96.3 | 91.1 |
| Yeast extract | 2.3 | 2.3 |
| Dextrose monohydrate | | 3.6 |
| Xylose | | 0.05 |
| Cysteine HCl | | 0.05 |
| Glycine | | 1.5 |
| Thickening agent | 0.95 | 0.95 |
| Vitamin/nutrient mixture | 0.44 | 0.44 |

The jelly used in the production of Product 1 contained a Maillard flavour precursor mixture of two carbonyl compounds (glucose and xylose) and two amino compounds (cysteine and glycine).

The composition of the vitamin/nutrient mixture, by weight of the final product, is shown in Table 4.

TABLE 4

| Vitamins & nutrients | mg/kg |
| --- | --- |
| Taurine | 700 |
| Thiamine | 29.4 |
| Riboflavin | 1.5 |
| Pyridoxine | 4.9 |

The chunks of restructured meat and the jellies were introduced into pouches in a weight ratio of 35:65 and retort sterilised to a $F_0$ value in the range of 40 to 60.

When the sterilized product was carefully separated into a restructured meat component and sauce component, it was found that the restructured meat component constituted about 60 wt. % of the sterilized product and the jelly about 40 wt. % of the sterilized product.

The sterilized wet pet food product prepared with the Maillard flavour precursor mixture (Product 1) was subjected to a flavour analysis (stable isotope dilution analysis using GC-MS) to determine the concentrations of a number of known Maillard flavour substances. The results of this analysis is shown in Table 5.

TABLE 5

| Maillard flavour substance | μg/kg |
| --- | --- |
| 2-ethyl-3,5-dimethylpyrazine | 3.9 |
| 3-methylbutanal | 540 |
| methional | 170 |
| 2-furfurylthiol | 1.5 |
| 4-hydroxy-2,5-dimethyl-3(2H)-furanone | 3,490 |

EXAMPLE 2

A feeding trial was conducted with the two wet cat food products (Product 1 and Control 1) of Example 1. In these feeding trials called "two-bowl test" or "versus test" the two products were presented simultaneously to a group of cats. Identical amounts of product were served in each of the two bowls. In the feeding trials the cats were twice exposed to the two products. The position of the two bowls was switched in the second exposure to avoid any bias. The quantity eaten was measured after a single meal exposure. Statistical analyses (Analysis of variance) were made on the data to determine the statistical significance of the observed differences. The outcome of the feeding trial is summarized in Table 6.

TABLE 6

| Variable | Control 1 | Product 1 | p-value |
|---|---|---|---|
| Consumed (g) | 31.8 | 59.7 | <0.0001 |

EXAMPLE 3

Restructured meat pieces for a wet cat food product were prepared on the basis of the recipe shown in Table 7.

TABLE 7

| Ingredient | Wt. % |
|---|---|
| Animal by-product | 91.28 |
| Water | 3.86 |
| Blood plasma powder | 3.00 |
| Minerals & vitamins | 2.26 |

The nutritional composition of the restructured meat pieces prepared on the basis of this recipe is depicted in Table 8.

TABLE 8

| Ingredient | Wt. % |
|---|---|
| Protein | 17.2 |
| Fat | 9.3 |
| Carbohydrate | 0.8 |
| Water | 69.6 |
| Remainder | 3.1 |

The restructured meat pieces were prepared as follows. Blocks of frozen meat and meat by-products were tempered overnight before being ground. The grounded meat was mixed with the dry and liquid ingredients in the proportions outlined in Table 7. Next, the mixture was emulsified in a bowl chopper. The resulting fine emulsion was transferred to a form press to produce an emulsion sheet that was passed through a steam tunnel with a residence time of two minutes. Temperature of the raw emulsion was raised to about 82° C. at the steam tunnel discharge. The cooked, firm sheet so obtained was cut into slices. The dimensions of these slices were approximately 10 mm×7 mm×6 mm.

Next, the restructured meat pieces were combined with two different gravies having the composition described in Table 9.

TABLE 9

| | Wt. % | |
|---|---|---|
| Ingredient | Control 2 | Product 2 |
| Water | 96.4 | 94.8 |
| Yeast extract | 2.7 | 2.7 |
| Dextrose monohydrate | | 0.05 |
| Rhamnose | | 0.01 |
| Cysteine HCl | | 0.05 |
| Glycine | | 1.5 |
| Thickening agent | 0.8 | 0.8 |
| Caramel colour solution | 0.07 | 0.07 |

The gravy used in the production of Product 2 contained a Maillard flavour precursor mixture of two carbonyl compounds (glucose and rhamnose) and two amino compounds (cysteine and glycine).

The chunks of restructured meat and the gravies were introduced into pouches in a weight ratio of 45:55 and retort sterilised to a $F_0$ value in the range of 40 to 60.

The sterilized wet pet food product prepared with the Maillard flavour precursor mixture (Product 2) was subjected to a flavour analysis (stable isotope dilution analysis using GC-MS) to determine the concentrations of a number of known Maillard flavour substances. The results of this analysis is shown in Table 10.

TABLE 10

| | μg/kg | |
|---|---|---|
| Maillard flavour substance | Control 2 | Product 2 |
| 2-ethyl-3,5-dimethylpyrazine | 0.86 | 1.3 |
| methional | 91 | 130 |
| 2-acetylthiazole | 550 | 690 |
| 4-hydroxy-2,5-dimethyl-3(2H)-furanone | 900 | 3300 |

EXAMPLE 4

A feeding trial was conducted with the two wet cat food products (Product 2 and Control 2) of Example 3. In these feeding trials called "two-bowl test" or "versus test" the two products were presented simultaneously to a group of cats. Identical amounts of product were served in each of the two bowls. In the feeding trials the cats were twice exposed to the two products. The position of the two bowls was switched in the second exposure to avoid any bias. The quantity eaten was measured after a single meal exposure. Statistical analyses (Analysis of variance) were made on the data to determine the statistical significance of the observed differences. The outcome of the feeding trial is summarized in Table 11.

TABLE 11

| Variable | Control 2 | Product 2 | p-value |
|---|---|---|---|
| Consumed (g) | 28.1 | 35.9 | <0.1 |

EXAMPLE 5

Two wet cat food products (Control 3 and Product 3) were prepared consisting of restructured meat pieces and a sauce component using the process described in Example 3.

The restructured meat pieces were prepared on the basis of the recipe shown in Table 10.

TABLE 10

| Ingredient | Wt. % |
|---|---|
| Animal by-products | 77.6 |
| Heat settable binder | 4.6 |
| Minerals, vitamins & nutrients | 3.4 |
| Wheat flour | 6.1 |
| Wheat gluten | 3.2 |
| Water | 5.1 |

These restructured meat pieces were combined with two different gravies having the composition described in Table 11. The restructured meat pieces and the gravies were introduced into pouches in a weight ratio of 50:50 and retort sterilised to a $F_0$ value in the range of 40 to 60.

TABLE 11

| Ingredient | Wt. % | |
| --- | --- | --- |
|  | Control 3 | Product 3 |
| Water | 96.1 | 95.6 |
| Thickening agents | 2.1 | 2.1 |
| Caramel solution | 0.04 | 0.04 |
| Maillard flavour | 1.75 | 1.75 |
| Yeast extract |  | 0.50 |

A feeding trial was conducted with the two wet cat food products. In these feeding trials called "two bowl test" or "versus test" the two products were presented simultaneously to a group of cats. Identical amounts of product were served in each of the two bowls. In the feeding trials the cats were twice exposed to the two products. The position of the two bowls was switched in the second exposure to avoid any bias. The quantity eaten was measured after a single meal exposure. Statistical analyses (Analysis of variance) were made on the data to determine the statistical significance of the observed differences. The outcome of the feeding trial is summarized in Table 12.

TABLE 12

| Variable | Control 3 | Product 3 | p-value |
| --- | --- | --- | --- |
| Weight eaten (g) | 16.8 | 24.4 | <0.1 |

The invention claimed is:

1. A process of preparing a sterilized wet pet food product comprising:
    a) preparing a meaty mass having a water content of at least 40 wt. % by mixing the following ingredients:
        30-80% by weight of the meaty mass of ground animal material selected from meat, animal by-products and combinations thereof,
        15-40% by weight of the meaty mass of heat settable binder consisting of vegetable protein; and
        0-40% by weight of the meaty mass of one or more other pet food components;
    b) heating the meaty mass to a temperature of at least 110° C. to coagulate the non-animal protein and shaping the heated mass into restructured meat pieces;
    c) introducing the restructured meat pieces together with one or more other pet food ingredients, into a package, and sealing the package to produce a packaged wet pet food product, wherein the one or more other pet food ingredients comprise:
        yeast extract in a total amount of 0.1-3% by weight of the wet pet food product; and
        a Maillard component in a total amount of 0.01-5% by weight of the wet pet food product, the Maillard component selected from the group consisting of a carbonyl source, a process flavour and combinations thereof; and
    d) sterilizing the packaged wet pet food product by heating the product in the package to a temperature of at least 80° C., which causes a Maillard reaction to occur, forming one or more of:
        at least 1.7 mg/kg of substituted thiazoles selected from 2-acetylthiazole, 2-methylthiazole, 4-methylthiazole and combinations thereof,
        at least 0.45 mg/kg of Strecker aldehydes selected from methional, 2-methylbutanal, 3-methylbutanal and combinations thereof,
        at least 1.5 mg/kg of substituted furans and furanones selected from 4-hydroxy-2,5-dimethyl-3(2H)-furanone, 4-hydroxy-5-methyl-3(2H)-furanone, 3-Hydroxy-4,5-dimethylfuran-2(5H)-one and combinations thereof, or
        at least 0.6 µg/kg of 2-furfurylthiol.

2. The process of claim 1, wherein the heat settable vegetable protein is selected from gluten, soy protein and combinations thereof.

3. The process of claim 1, wherein the carbonyl compound is selected from monosacharides, disaccharides, uronic acids and combinations thereof.

4. The process of claim 3, wherein the carbonyl compound is selected from xylose, glucose, sucrose, rhamnose, lactose, maltose and combinations thereof.

5. The process of claim 1, wherein the carbonyl compound is added in a total amount of 0.02-2.5% by weight of the wet pet food product.

6. The process of claim 1, wherein, prior to the sterilizing step, the packaged wet pet food contains 0.01-2 wt. % of an amino compound selected from proteinogenic amino acids, hydroxyproline, cystine, ornithine and combinations thereof.

7. The process of claim 6, further comprising adding a source of the amino compound in an amount sufficient to provide a total amount of at least 0.01% by weight of the pet food product, said source of the amino compound containing at least 5% of the amino compound by weight of dry matter.

8. The process of claim 7, wherein the amino compound is an amino acid selected from cysteine, cystine, methionine, proline, leucine, phenylalanine, glutamic acid and combinations thereof.

9. The process of claim 6, wherein the restructured meat pieces are combined with sauce before the sealing of the package, and wherein the sauce contains at least 0.02 wt. % of the amino compound.

10. The process of claim 1, wherein the restructured meat pieces are combined with sauce before the sealing of the package, and wherein the sauce contains at least 0.02 wt. % of the Maillard component.

11. The process of claim 1, wherein taurine is added to the wet pet food product in a concentration 0.1-1% by weight of the wet pet food product.

12. The process of claim 1, wherein the vegetable protein is a vegetable protein concentrate.

13. The process of claim 1, wherein the meaty mass is heated to a temperature of at least 110° C. for less than 5 minutes at a pressure of greater than 5 bar.

* * * * *